Figure 1:
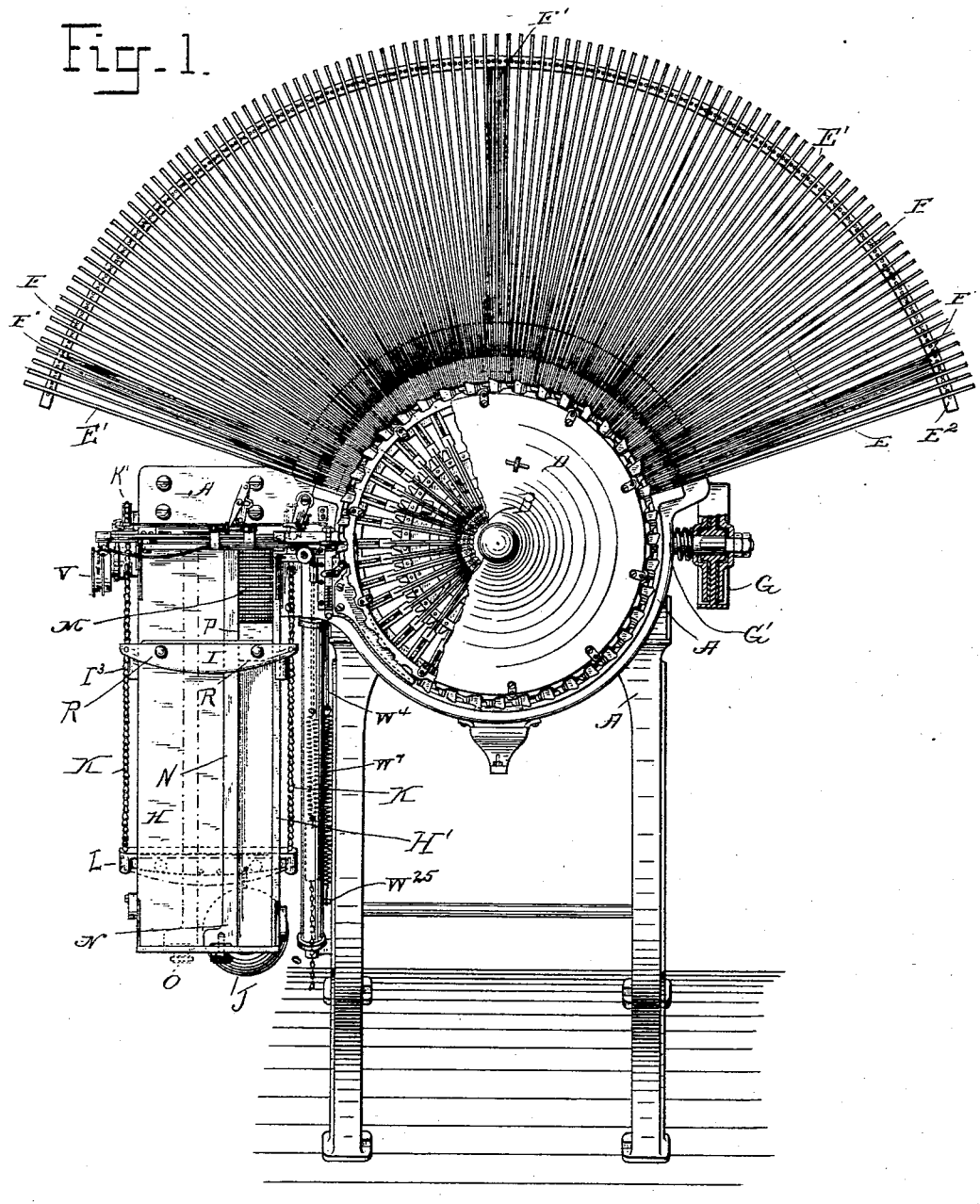

(No Model.) 18 Sheets—Sheet 1.

A. DOW.
TYPE DISTRIBUTER.

No. 572,050. Patented Nov. 24, 1896.

WITNESSES:
Chas. Hanmann,
L. Dow

INVENTOR
Alexander Dow
BY
L. Dow
his ATTORNEY (No Model.)  18 Sheets—Sheet 2.
A. DOW.
TYPE DISTRIBUTER.
No. 572,050.  Patented Nov. 24, 1896.
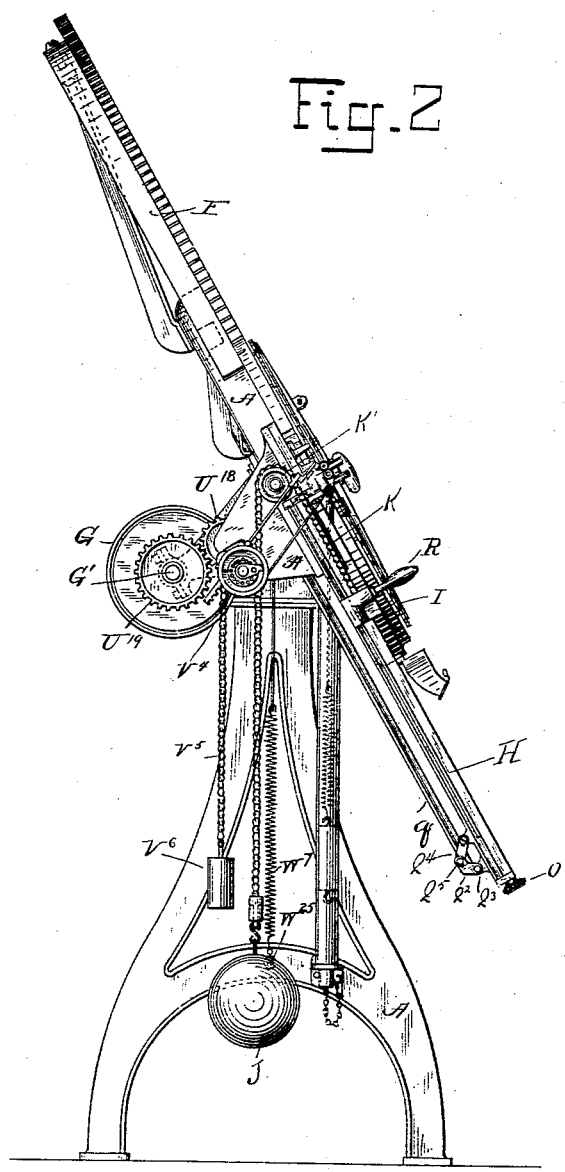
WITNESSES:
Chas. Hanimann,
L. Dow
INVENTOR
Alexander Dow
BY
L. K. Deane
his ATTORNEY.
THE NORRIS PETERS CO., PHOTO-LITHO., WASHINGTON, D. C.

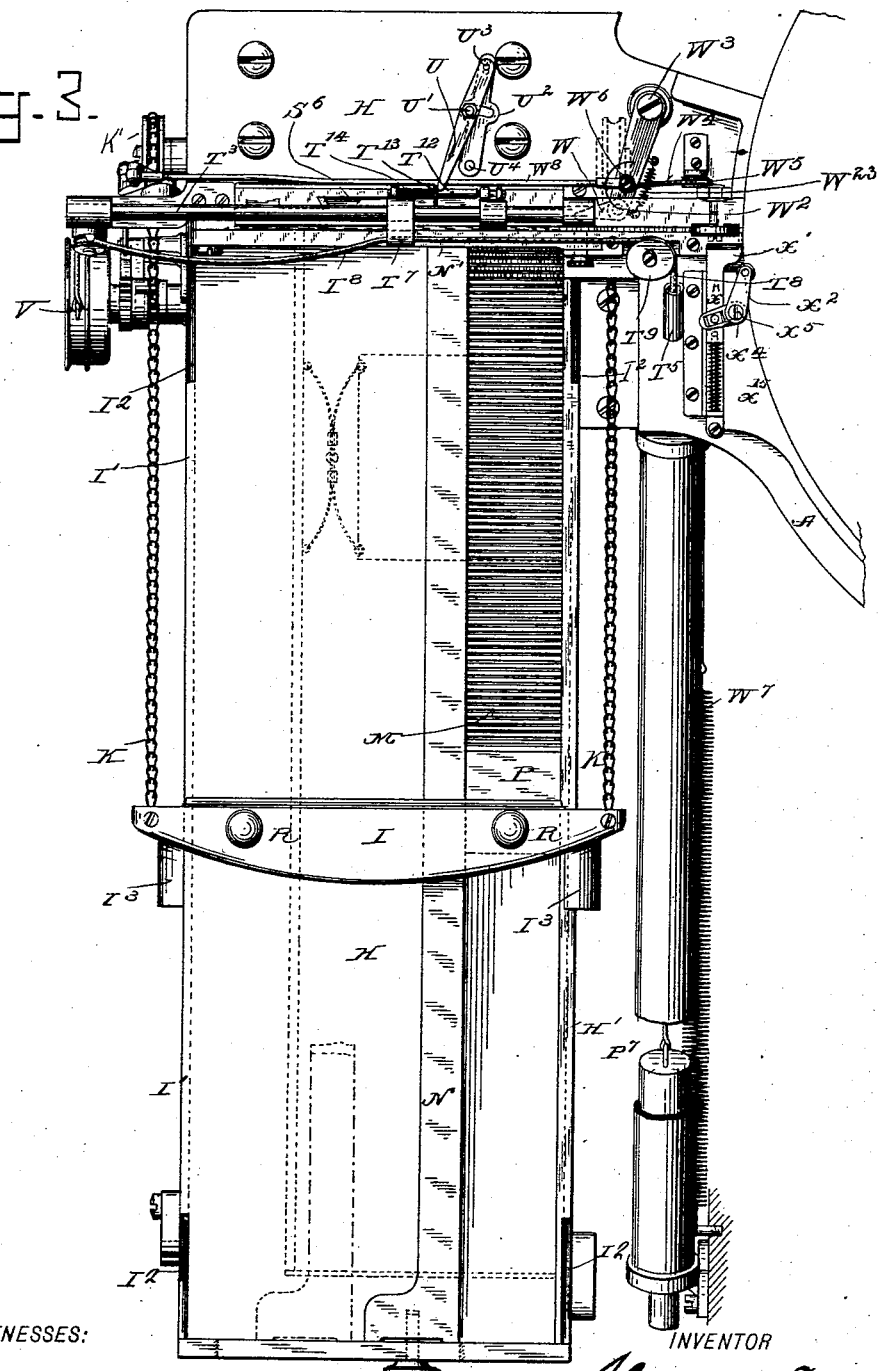

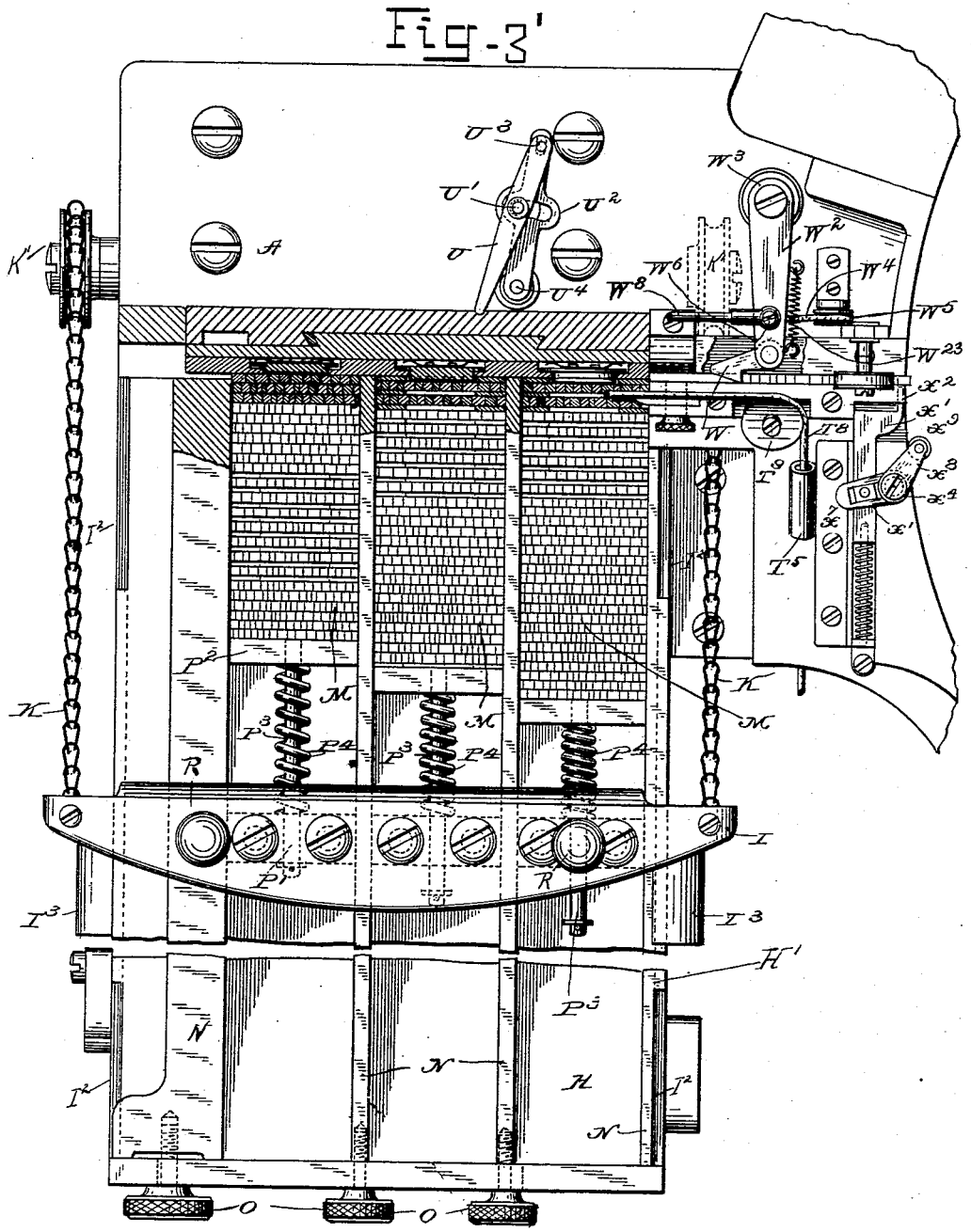

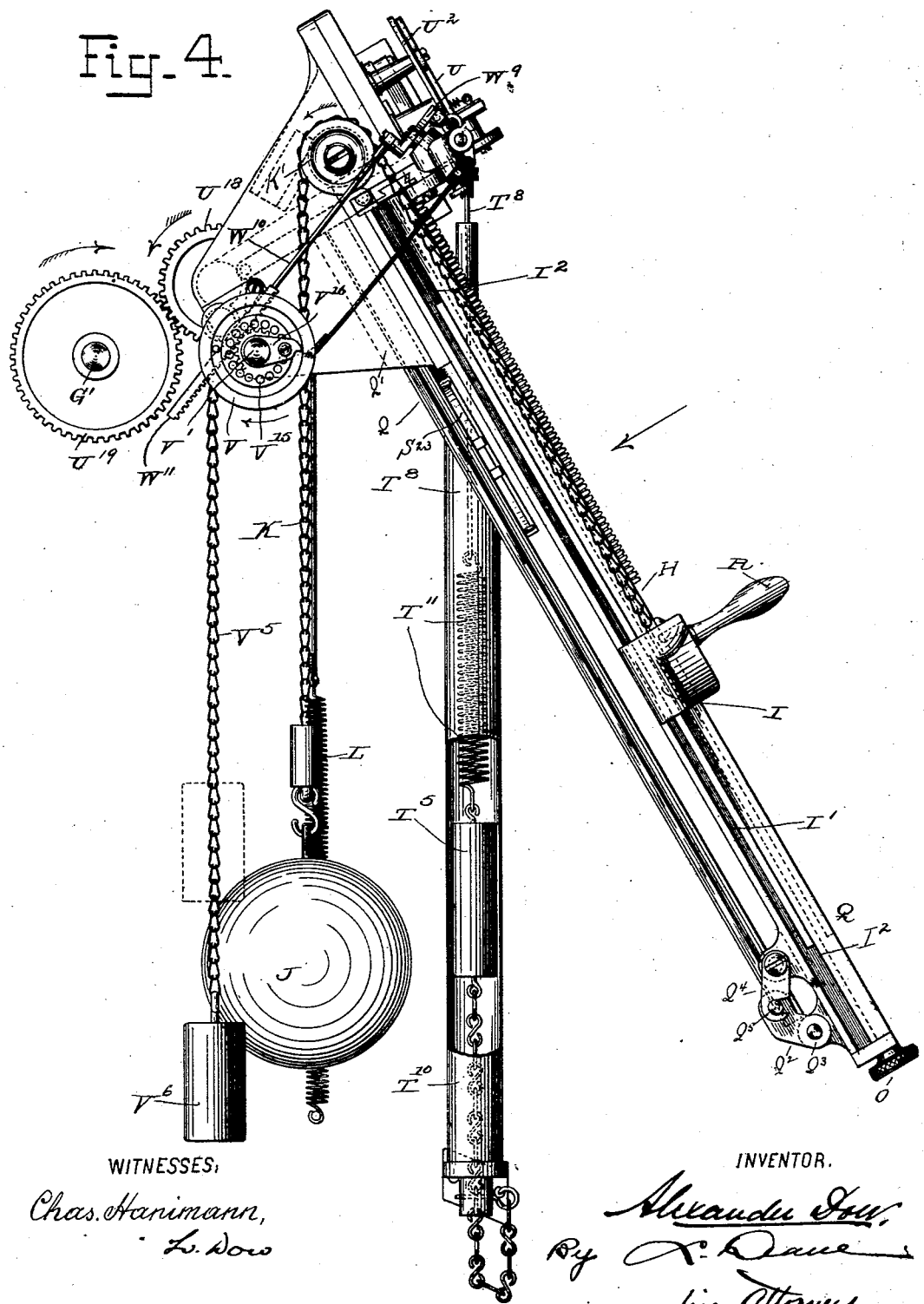

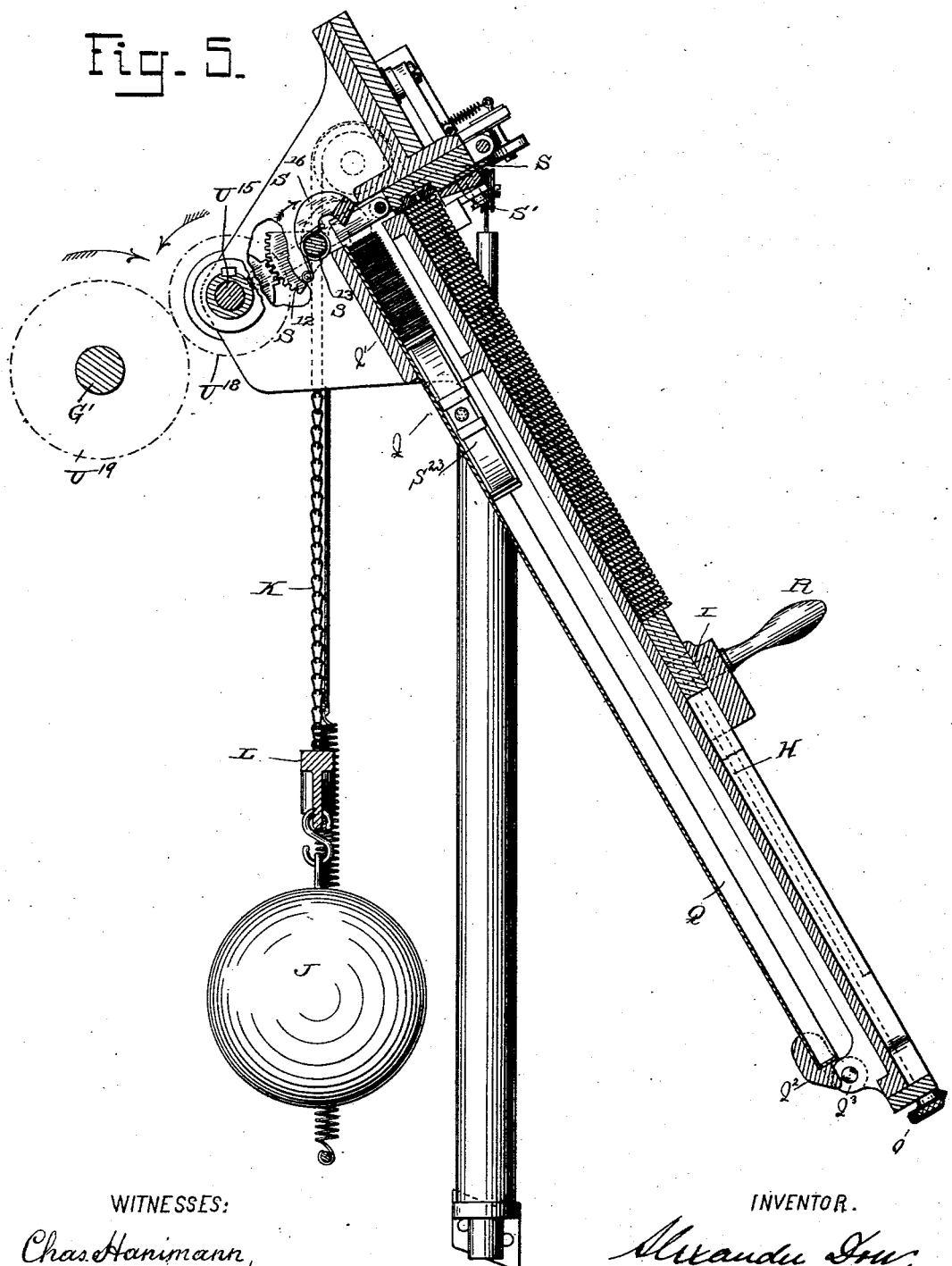

(No Model.) 18 Sheets—Sheet 7.
A. DOW.
TYPE DISTRIBUTER.
No. 572,050. Patented Nov. 24, 1896.
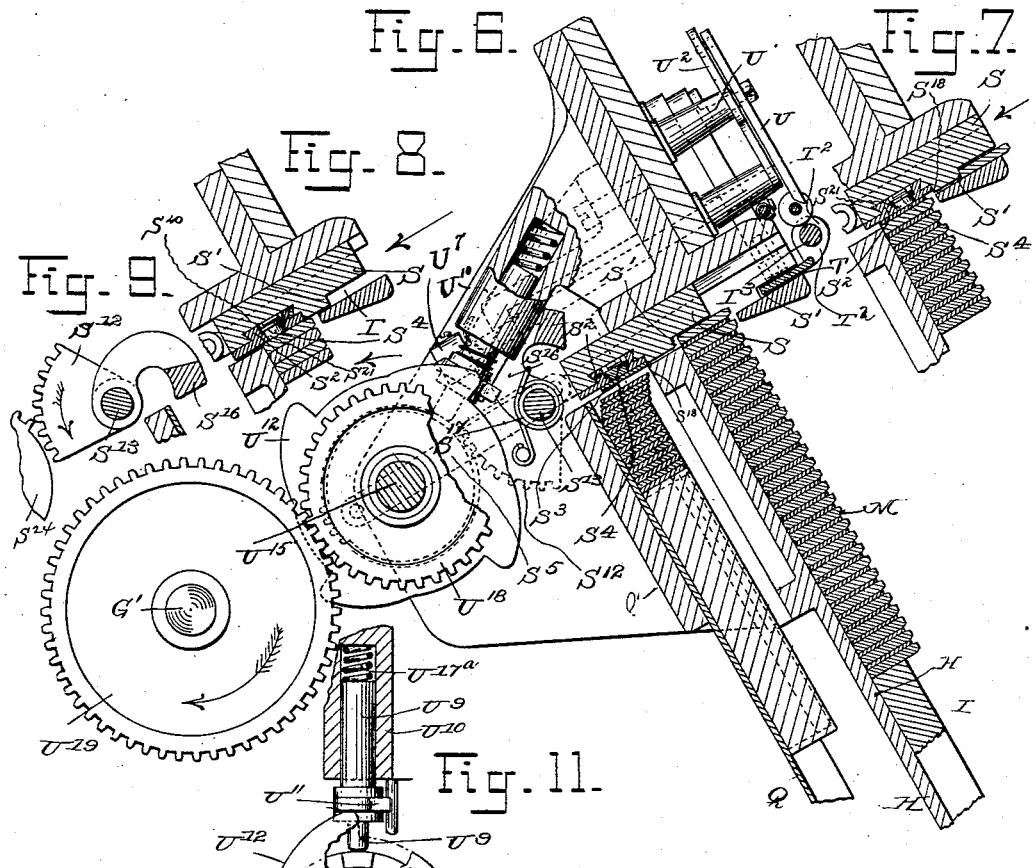
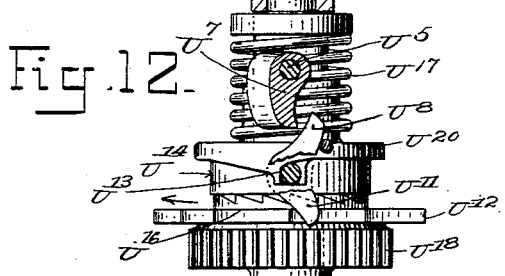
WITNESSES:
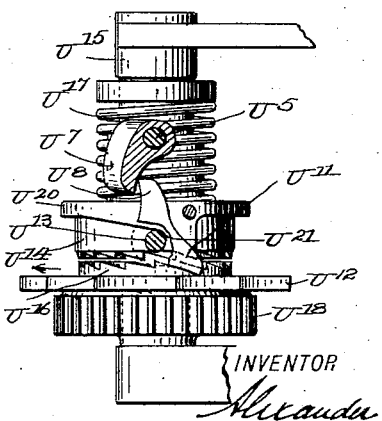
INVENTOR
Alexander Dow
BY
his ATTORNEY.

(No Model.)  18 Sheets—Sheet 8.
A. DOW.
TYPE DISTRIBUTER.
No. 572,050. Patented Nov. 24, 1896.
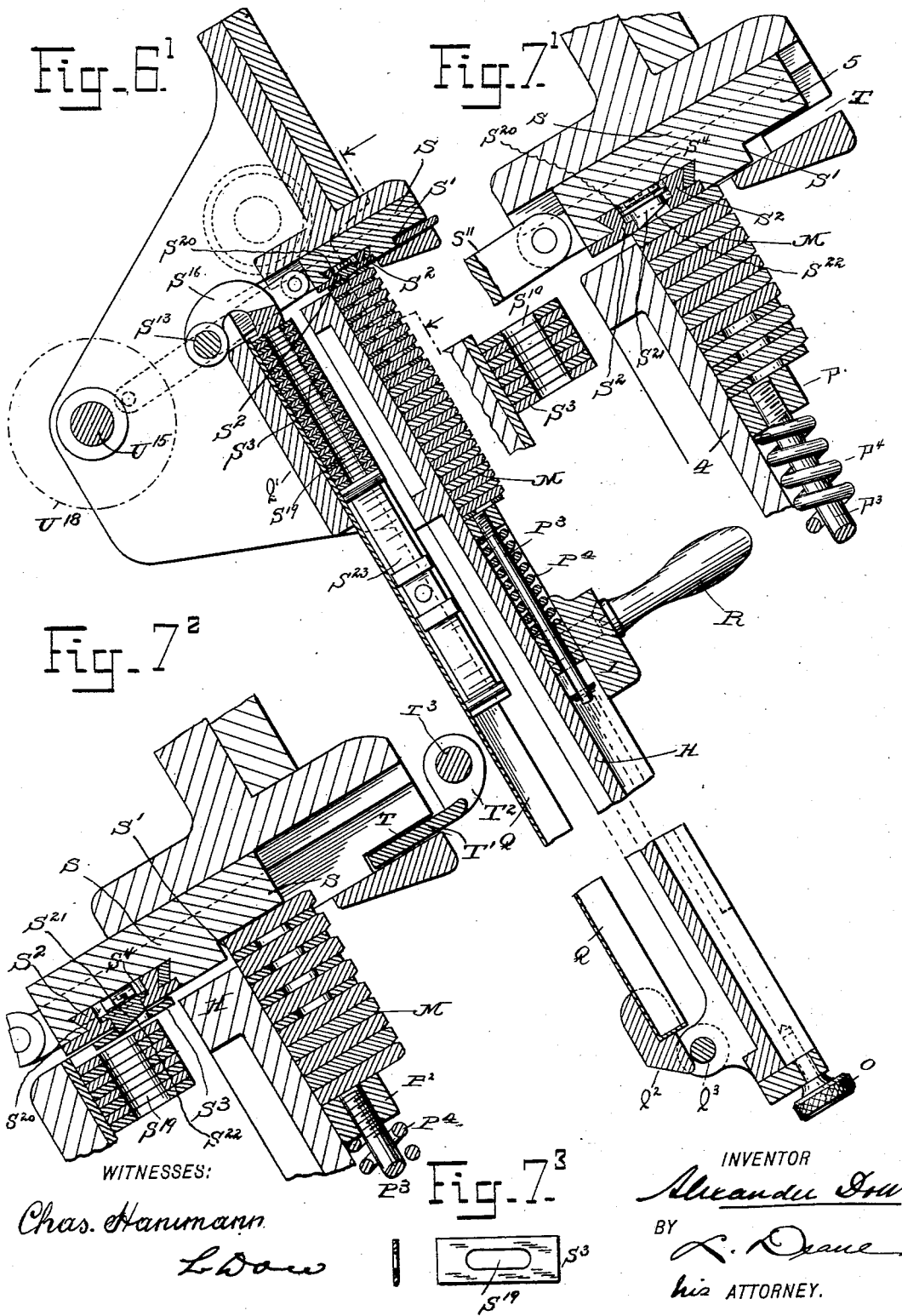
WITNESSES:
Chas. Hanumann
L. Dow
INVENTOR
Alexander Dow
BY
L. Deane
his ATTORNEY.
THE NORRIS PETERS CO., PHOTO-LITHO., WASHINGTON, D. C.

(No Model.) 18 Sheets—Sheet 9.

A. DOW.
TYPE DISTRIBUTER.

No. 572,050. Patented Nov. 24, 1896.

WITNESSES:
Chas. Hanimann
L. Dow

INVENTOR
Alexander Dow
BY L. Davis
his ATTORNEY.

(No Model.)  18 Sheets—Sheet 10.
A. DOW.
TYPE DISTRIBUTER.
No. 572,050. Patented Nov. 24, 1896.
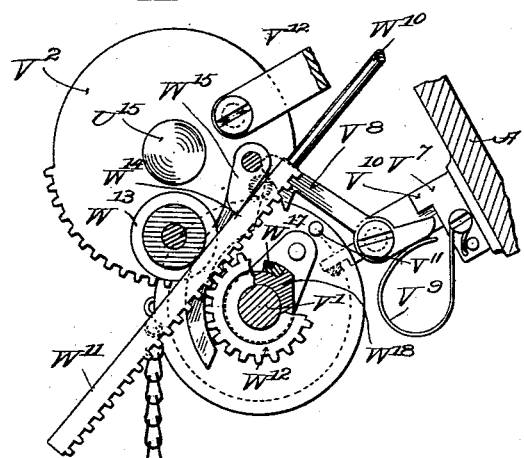
Fig. 14.
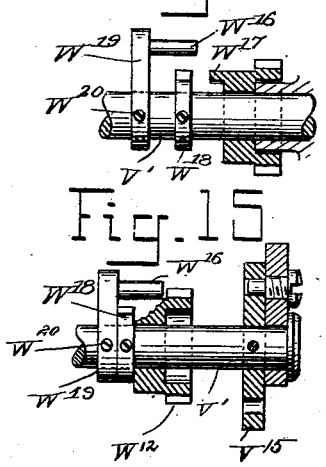
Fig. 16.
Fig. 15.
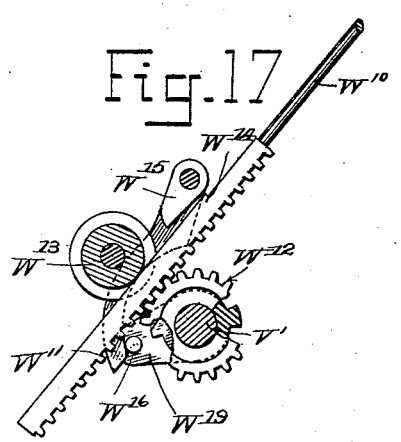
Fig. 17.
WITNESSES:
Chas. Hanimann
L Dow
INVENTOR
Alexander Dow.
BY
L. R. Dane
his ATTORNEYS.

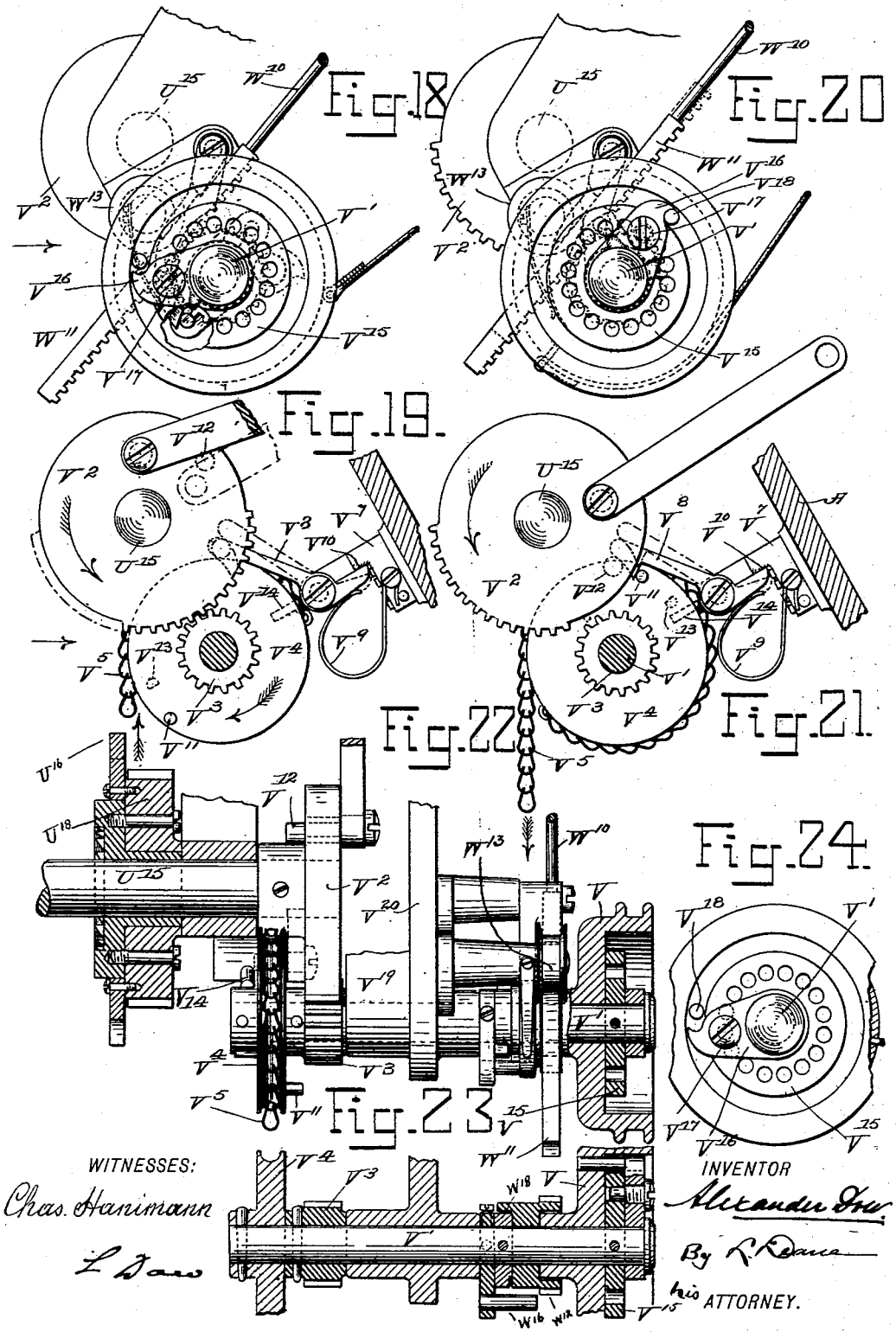

(No Model.)

18 Sheets—Sheet 12.

A. DOW.
TYPE DISTRIBUTER.

No. 572,050.

Patented Nov. 24, 1896.

WITNESSES:
Chas. Hanimann
L. Dow

INVENTOR
Alexander Dow
BY L. Keane
his ATTORNEY.

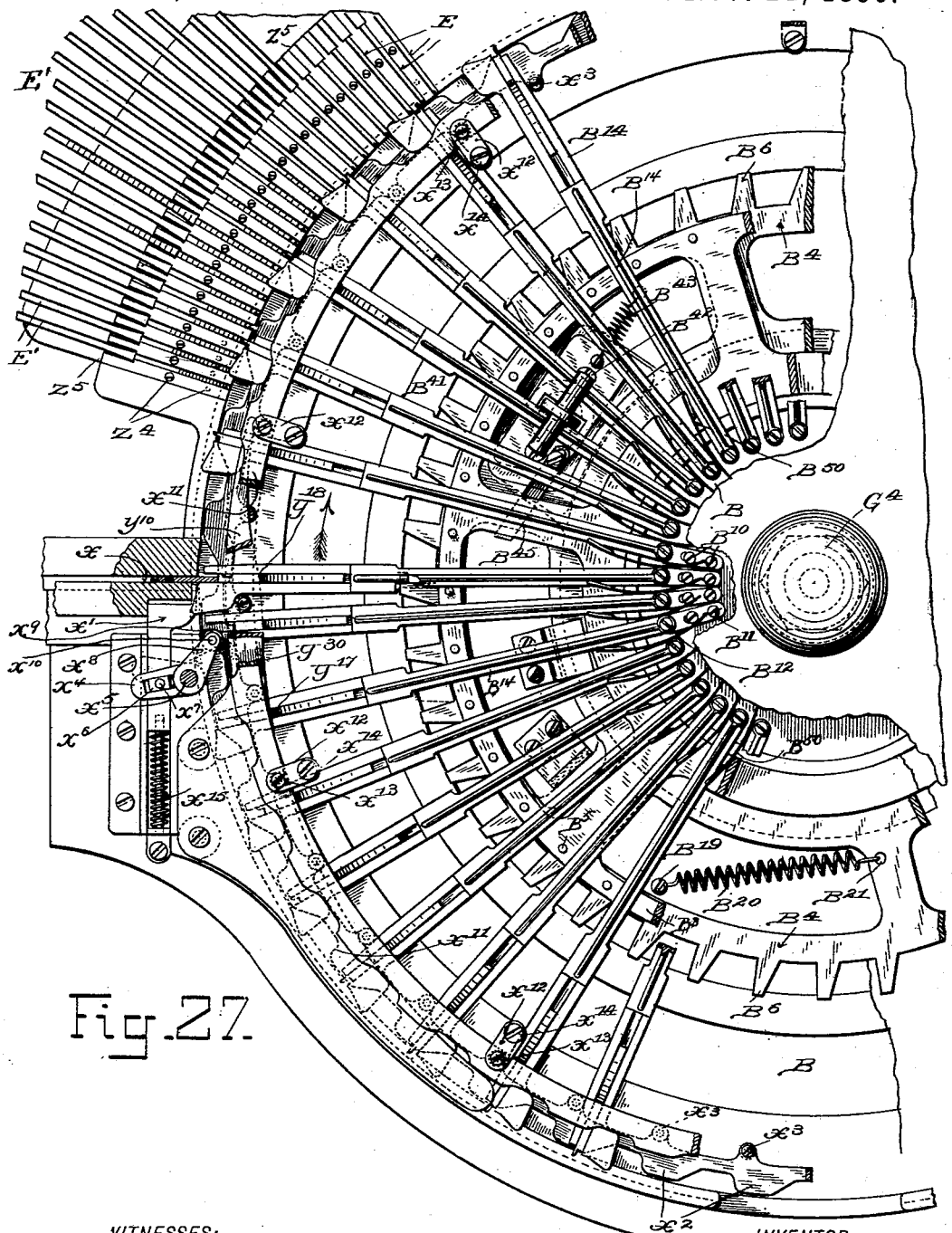

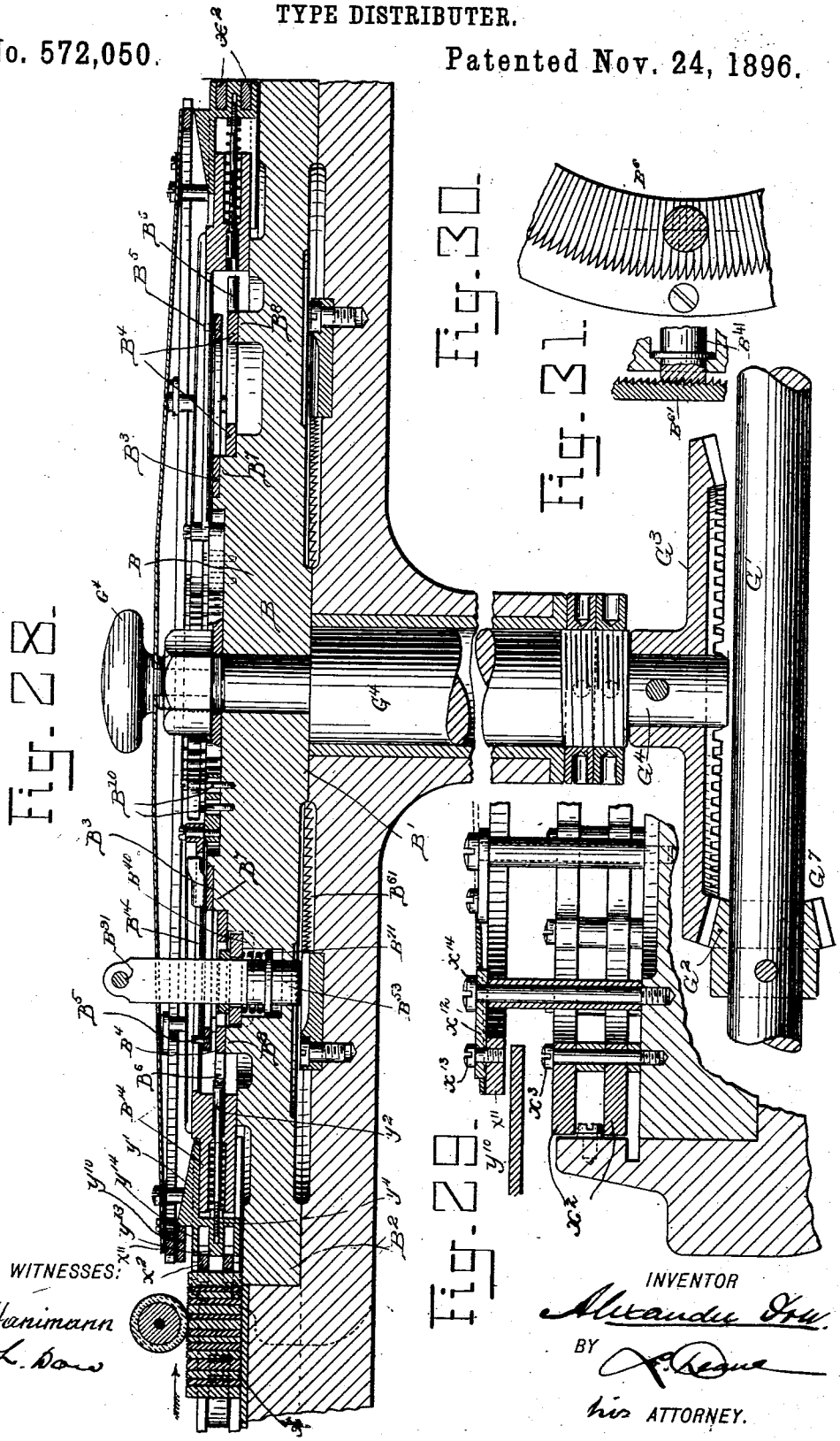

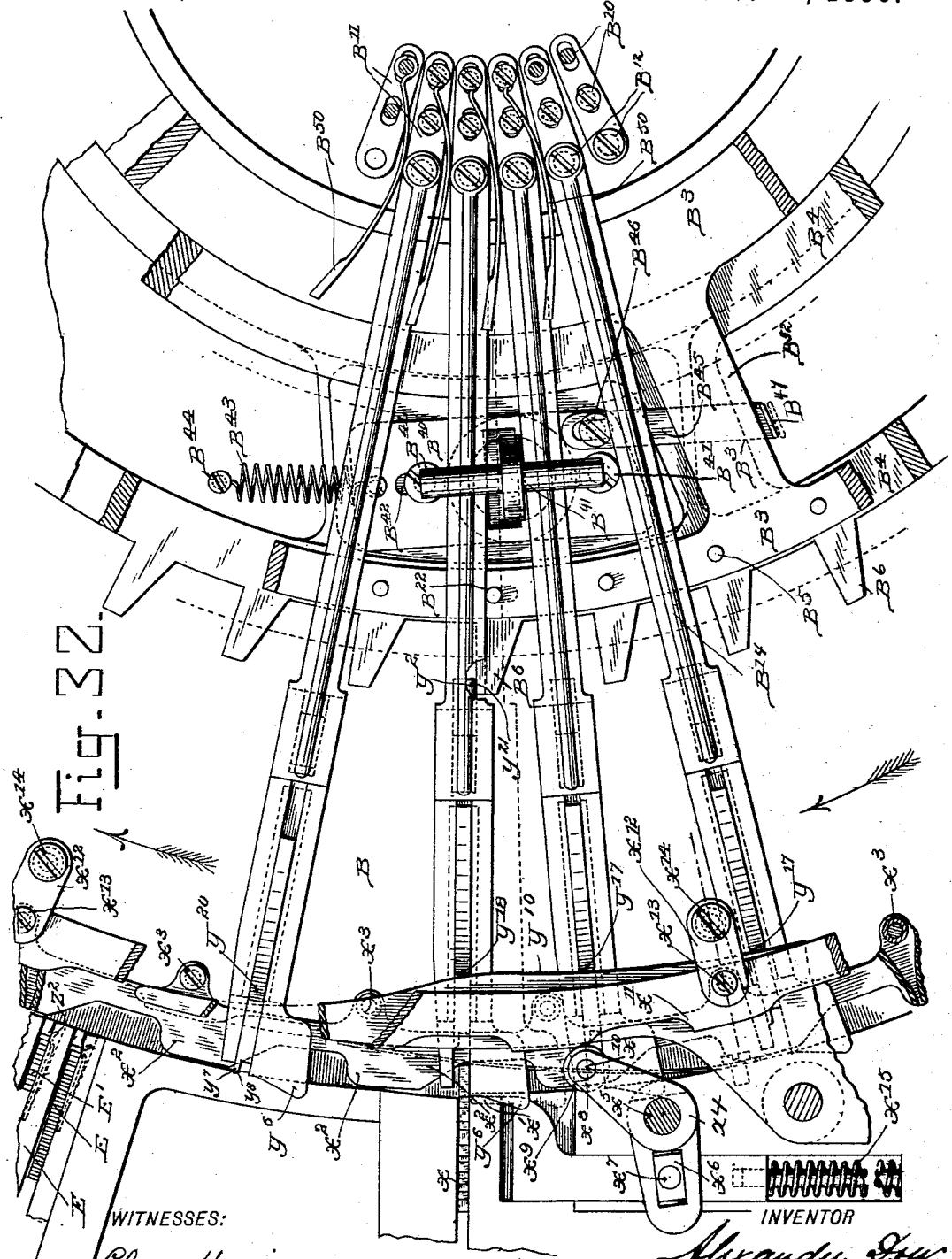

(No Model.)
18 Sheets—Sheet 16.

A. DOW.
TYPE DISTRIBUTER.

No. 572,050. Patented Nov. 24, 1896.

WITNESSES:
Chas. Hanmann
Fo. Dow

INVENTOR
Alexander Dow
BY L. Deane
his ATTORNEY.

(No Model.) 18 Sheets—Sheet 17.
A. DOW.
TYPE DISTRIBUTER.
No. 572,050. Patented Nov. 24, 1896.
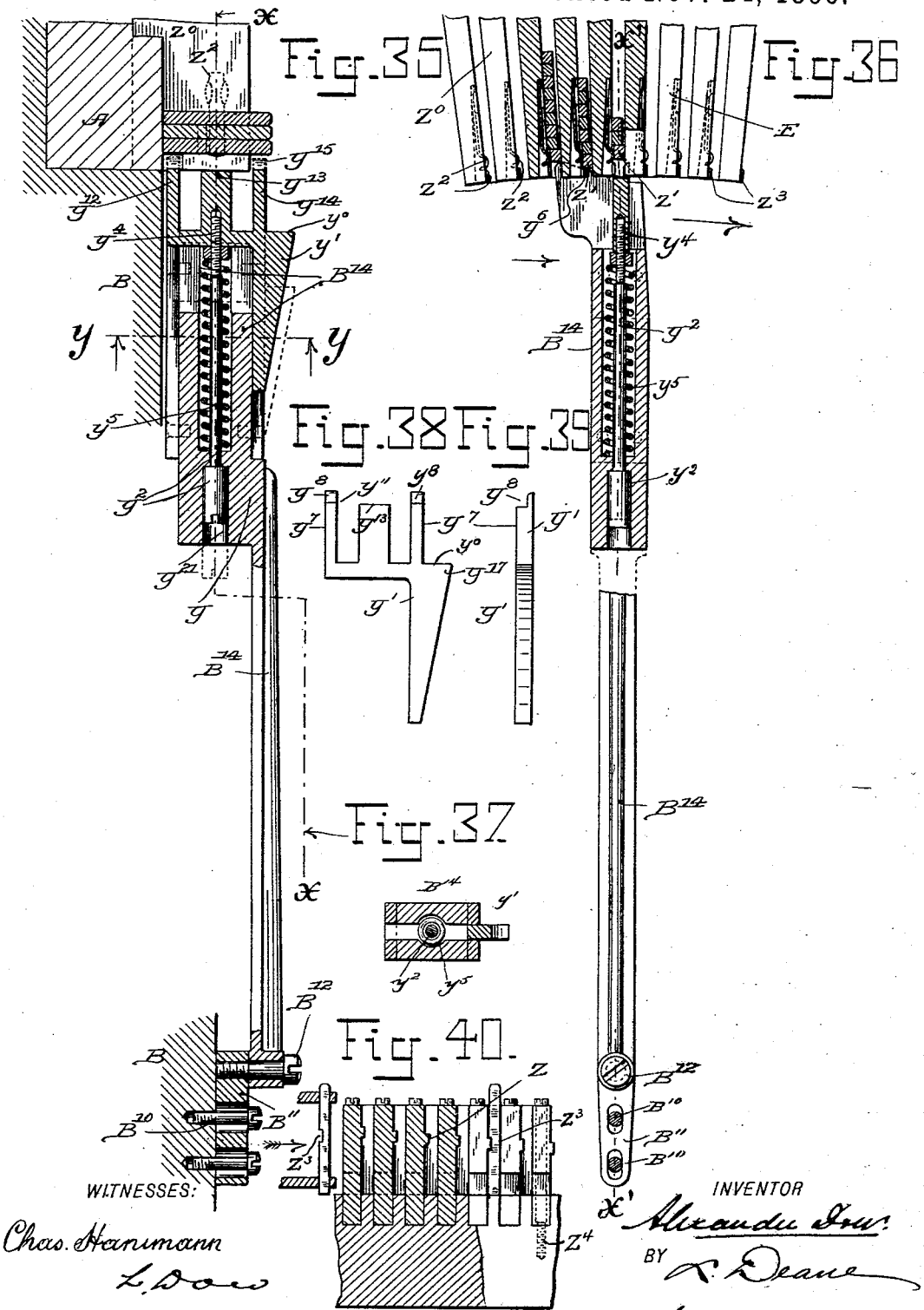

(No Model.)  18 Sheets—Sheet 18.
A. DOW.
TYPE DISTRIBUTER.
No. 572,050.  Patented Nov. 24, 1896.
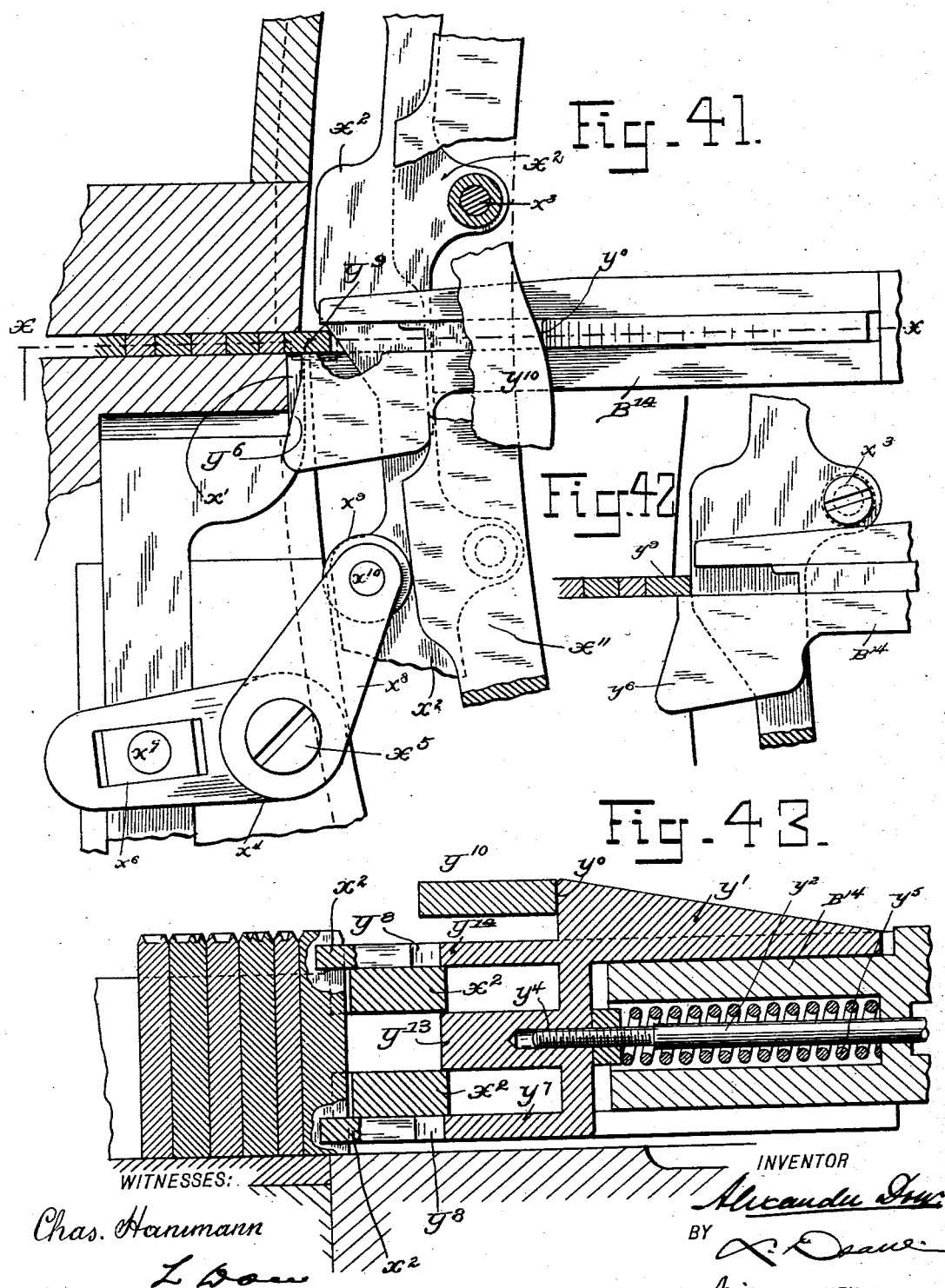

United States Patent Office.

ALEXANDER DOW, OF NEW YORK, N. Y., ASSIGNOR TO THE DOW COMPOSING MACHINE COMPANY, OF WEST VIRGINIA.

TYPE-DISTRIBUTER.

SPECIFICATION forming part of Letters Patent No. 572,050, dated November 24, 1896.

Application filed May 19, 1894. Serial No. 511,828. (No model.)

*To all whom it may concern:*

Be it known that I, ALEXANDER DOW, a citizen of the United States, residing at New York, in the county of New York and State of New York, have invented certain new and useful Improvements in Type-Distributers; and I do hereby declare the following to be a full, clear, and exact description of the invention, such as will enable others skilled in the art to which it appertains to make and use the same.

This invention belongs to that class of type-distributing machines in which each kind of letter or character, as "A" or "M," is designated by one or more nicks upon the edge, by means of which nicks the machine automatically separates the letters and delivers those with similar nicks into channels and reservoirs intended for such letters or characters, so that they can be readily used for type-setting machines.

The object of my invention is to distribute printers' type more rapidly and economically than has hitherto been done and with less injury to the type, and at the same time to remove the leads, rules, and quads automatically, which has not before been done, so far as I know.

My improvements consist in taking the type from a galley holding one or more columns of type, line by line, at the same time removing the leads, if any, elevating said lines into a channel in which it is fed forward continuously to a series of type-carriers connected to a continuously-revolving disk, each of which type-carriers measures and cuts off a single character, whether thick or thin, and delivers the same into a channel whose inner end is provided with wards which correspond to the nicks in said type or character. Each character is carried past the channel the wards of which do not correspond to its nicks and is delivered only into its appropriate channel or reservoir. These objects are attained by the mechanism illustrated in the accompanying drawings.

Figure 13:
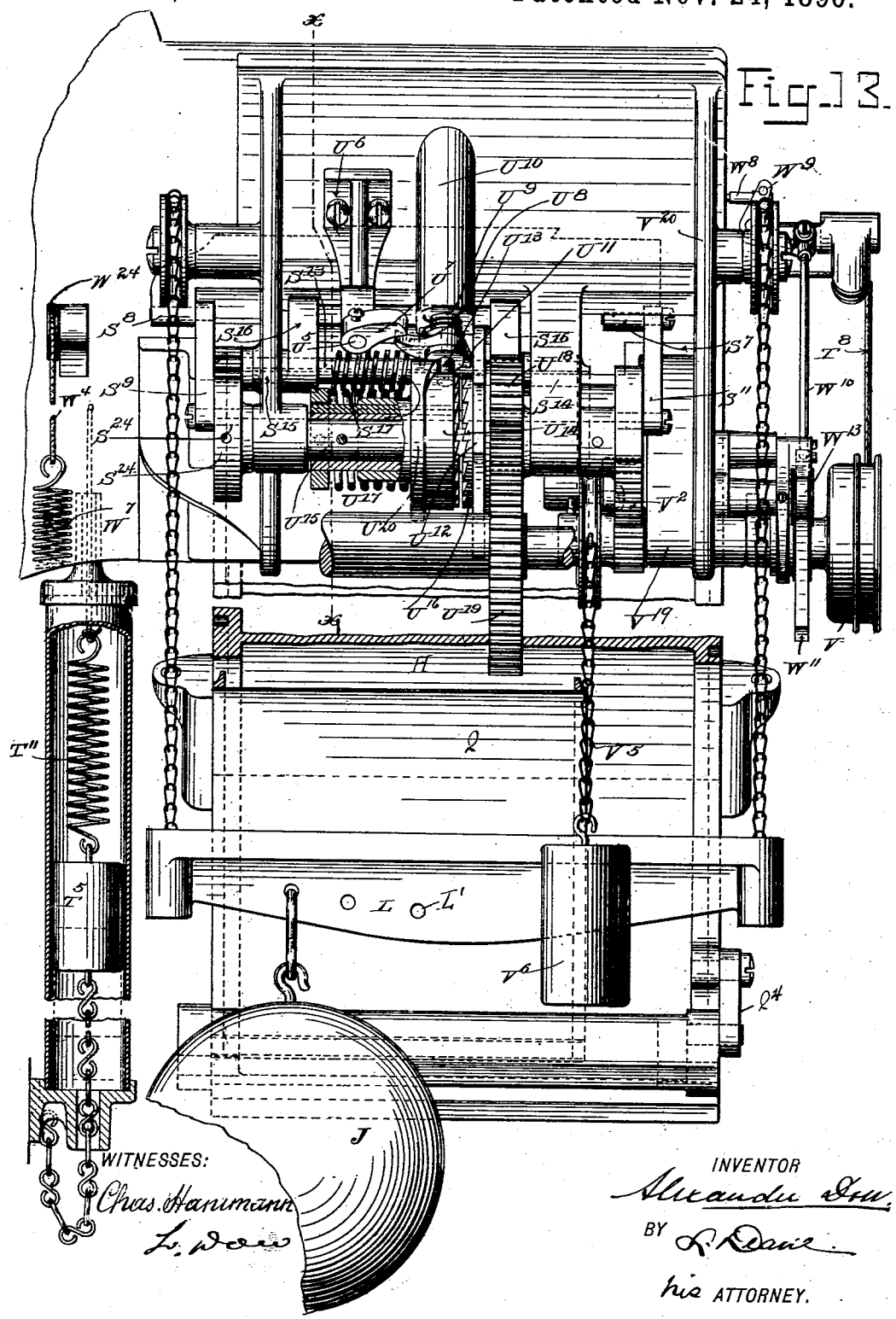
Figures 25, 26:
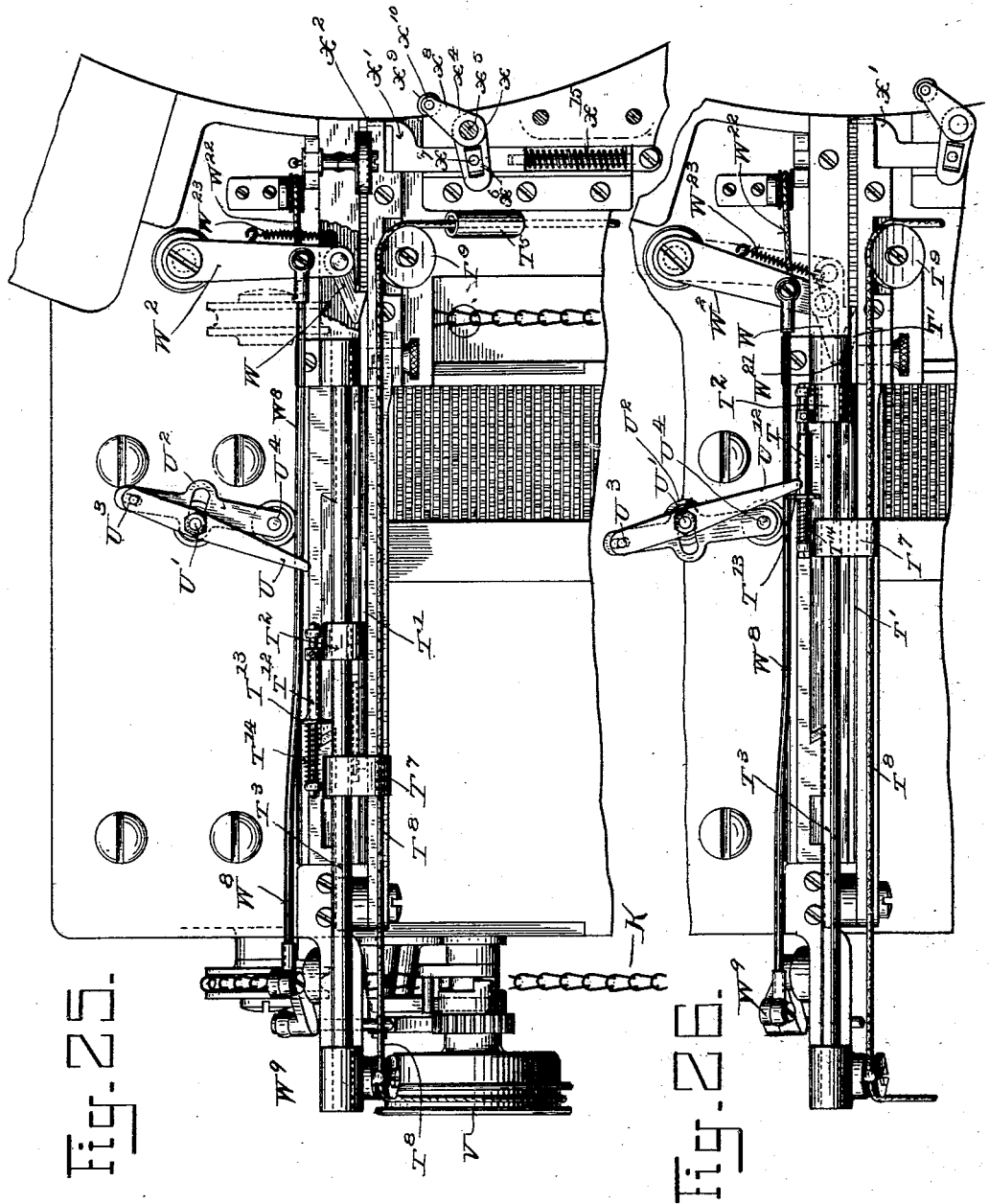
Figure 33:
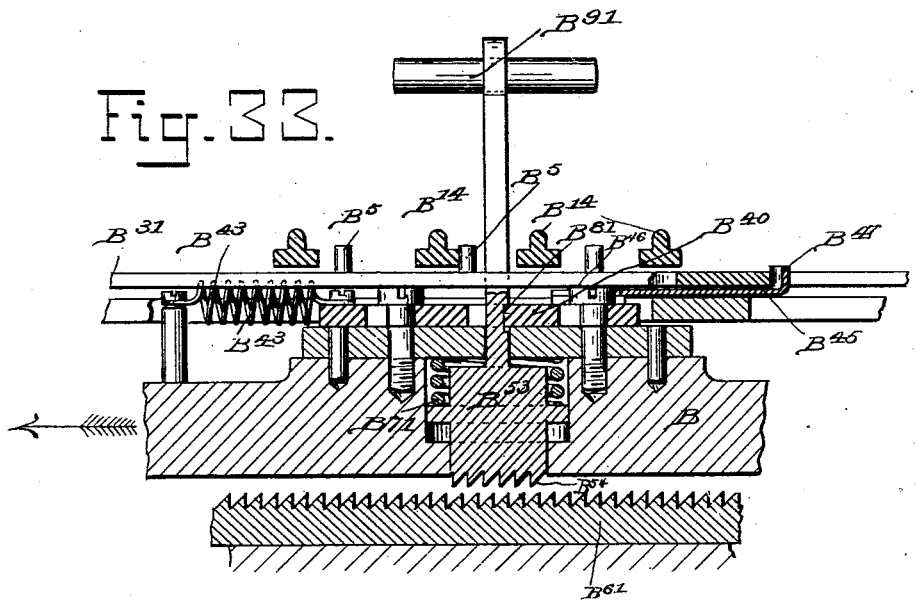
Figure 34:
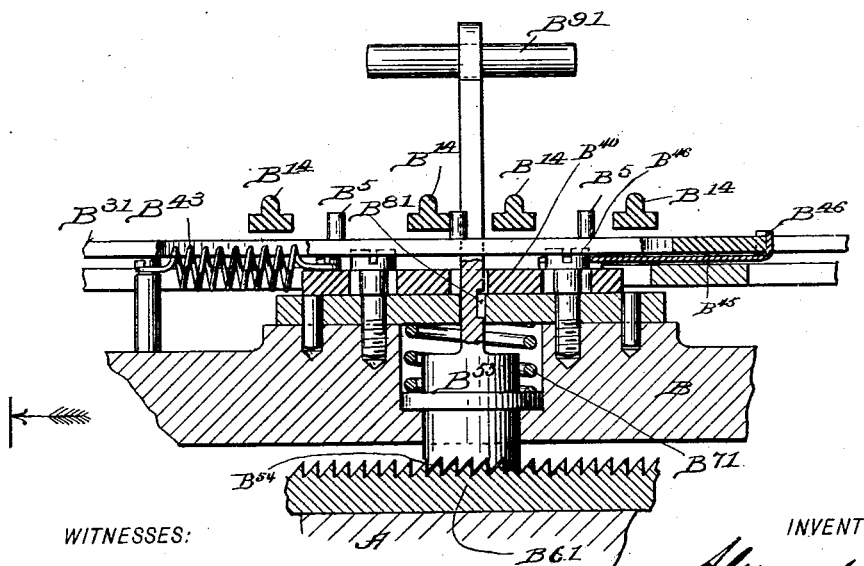

Figure 1 is a front elevation of a machine constructed in accordance with my invention. Fig. 2 is a side elevation. Fig. 3 is a front elevation of the galley. Fig. 3' is a like view showing three columns of ruled and solid matter being operated upon. Fig. 4 is a side elevation of the galley. Fig. 5 is a cross-sectional view of the same on line 5 5 of Fig. 3 and on line $x\ x$, Fig. 13. Figs. 6, 7, 8, 6', 7', and $7^2$ are detail sectional views of the line-lifting mechanism on line 5 5, Fig. 3. Fig. $7^3$ is a detail view of one of the rules. Fig. 9 is a detail sectional view of the lead-forcer. Figs. 10, 11, and 12 are detail views of the galley clutch and release mechanism. Fig. 13 is a rear elevation of galley, showing the mechanism for actuating the column-lifter, line-lifter, and line-forcer. Figs. 14, 15, 16, and 17 are detail views of the auxiliary line-driver mechanism. Figs. 18, 19, 20, 21, 22, 23, and 24 are detail views of the line-driver mechanism. Figs. 25 and 26 are detail elevations thereof. Fig. 27 is a detail front elevation of the distributing mechanism. Fig. 28 is a cross-sectional view of the same on line 28 28 of Fig. 27. Fig. 29 is another detail section thereof. Figs. 30 and 31 are detail views of the safety stop mechanism. Fig. 32 is a detail front elevation of the distributing-arms and connections. Figs. 33 and 34 are detail sectional views of the safety stop mechanism on line 33 33 of Fig. 32. Fig. 35 is a longitudinal section of one of the type-distributing arms. Fig. 36 is a section of Fig. 35 on line $x\ x$. Fig. 37 is a cross-section on the line $y\ y$, Fig. 35. Figs. 38 and 39 are detail views of one of the type-expelling pieces. Fig. 40 is a detail view, partly in section, showing the nicked type. Figs. 41 and 42 are detail views of the mechanism for arresting and releasing the type as they are fed to the distributing mechanism. Fig. 43 is a detail sectional view of the outer end of one of the distributing-arms, showing the type-expelling pieces on line $x\ x$ of Fig. 41.

Similar letters refer to similar parts throughout the several views.

The frame A of the machine has secured to it the galley H, upon which is to be placed the matter to be distributed, and has an annular recess portion in which rests and rotates the disk B, which supports the type-carrier arms and the operating mechanism therefor. The disk B is provided with a cover D, and situated near by are the radial type-holders E, resting upon the segment-support F, held in position by the radial arms F' from the frame A.

Under their proper designations I will describe in detail the various mechanisms and their functions, beginning with the galley.

The galley comprises the plate or bed H, provided with a side flange H' and stick N to embrace the column of matter M, the said stick being adjusted to columns of varying width by means of the set-screw O. If desired, several sticks N may be provided, as shown in Fig. 3', to accommodate several columns M of matter at one time.

Across the face of the galley and sliding up and down thereon is the column-lift I, with the lugs $I^3$ at the ends thereof embracing the guide-rails I', which are cut away at their ends $I^2$ to permit the column-lift I to be removed when at the top of its traverse by handles R and replaced at the lower end of the said traverse for purposes hereinafter to be explained. At the ends of the column-lift I are secured the cords or chains K, running over the pulleys K' to the equalizing-bar L, to which the actuating-weight J is secured by hooking it into one of the holes L'. It will be now readily understood that the column of matter is constantly pressed upward, a block P being interposed between the said column and the column-lift I to enable the last line of the column to be forced for distribution. Where there are several columns to be operated upon at one time, an adjustable block is provided, as shown in Fig. 3', comprising the plate $P^2$, with a stem $P^3$ entering the vertical hole P' in the column-lift I, and the pushing coil-spring $P^4$, this construction obviously giving a certain independent lifting force to each column, whereby a varying composition of matter, such as "ruled," "close," "leaded," and "double-leaded," will not hinder the synchronous forcing of all the top lines, as will hereinafter be described. The block P when the last line of the matter M is in position for distribution abuts the lug N' of the stick N and is stopped thereby. As the type, line by line, are lifted and distributed and the column is fed upward by the column-lifter I the attendant on the machine builds up below it one or more columns of type, so that when the column M, for example, has been distributed and the lifter I has reached its limit of movement at the top of the galley there is on the galley another body of type ready to be lifted up and distributed, line by line, as before. In this way no time is lost in loading the galley. The distribution can go on continuously. When the last line of the column of type has been distributed, the attendant takes hold of the two handles R R, Figs. 3, 4, and 6', and raises the column-lifter from its guide-rails I', in which it runs. The rails I' terminate at $I^2$ at such a point as to permit the raising of the column-lifter I only when the last line of the type-column has been raised by the line-lifter. (Seen in Fig. 4.)

At the back of the galley H is a removable lead-holder Q, inserted at its upper end in the body of the machine and resting on the flanges Q' of the frame A, and with its lower end resting on the plate $Q^2$, pivoted at $Q^3$ to the galley H and held into position by the hooks $Q^4$ engaging the studs $Q^5$ on the plate $Q^2$. The use of this lead-holder will be hereinafter explained.

The galley mechanism being now in operative order and the form in position, the top line thereof is ready to be acted upon by the line-lifter.

Dovetailed in the frame A and adapted to have a reciprocating motion parallel to the longitudinal axis of the type is a lifter-plate S, with the studs $S^7$ and $S^8$ at the ends thereof, journaled to which are the pitmen $S^9$ and $S^{11}$, secured by wrist-pins to the gears $S^{21}$ and $V^2$, both rigidly secured to the actuating-shaft $U^{15}$, mounted in bearings $U^{22}$ of the frame A. Thus in each revolution of the main shaft $U^{15}$ the lifter-plate S descends and rises, performing certain operations now to be described.

In the lifter-plate S (see Figs. 6, 7, 8, 6', 7', and $7^2$) is a shoulder or step S', slightly less in its depth than the thickness of the type to be distributed, and below this there is dovetailed into the lifter-plate S a lead-driving device $S^2$, which will be hereinafter described. The face of the said device $S^2$ is, however, slightly lower than that of the plate S, thus forming a shallow step $S^{18}$. (Best shown in Fig. 7.) It may now be readily seen that each time the lifter-plate S is thrust outward by its pitmen $S^9$ and $S^{11}$ the step S' will carry or lift up the top line of type-matter which has been pressed into it by the column-lift I and its actuating mechanism and place it in the channel T, where it is engaged by the line-driver mechanism to be hereinafter described. Between the lines of type are inserted the lead $S^3$, (shown in Fig. $7^3$ as having interior perforations $S^{19}$,) and as the lifter-plate S is brought back to its first position the step $S^{18}$ engages the upper edge of the lead $S^3$ and carries it off the galley into the lead-holder I, requiring, however, the aid of the lead-driving mechanism now to be described.

*Lead-driver.*—Removably dovetailed into the lifter-plate S is the lead-driver $S^2$, which may vary in number to correspond with the number of columns being operated upon at one time. In this plate $S^2$ is a shouldered recess $S^{20}$, containing spring-actuated plate $S^4$, with a projecting lug $S^{21}$, with a bevel-face $S^{22}$, so adapted that when the lifter-plate S carries its line to the channel T the said lug $S^{21}$ will retract into its recess till it can engage the slot $S^{19}$ of the lead $S^3$, and upon the return of the lifter-plate S to aid in throwing the lead into the lead-holder I. When thus thrown into the said holder, the lead is ready to be forced downward in the holder I, the entire column of lead being supported by a movable clip device $S^{23}$ in order that the column shall not become disarranged by the leads falling in various positions, and I will now describe the lead-forcer.

Secured to the shaft $S^{13}$, mounted in the bearings $S^{14}$ and $S^{15}$ of the frame A, is the lead-forcing dog $S^{16}$, provided with a retracting coil-spring $S^{17}$. There should be one of these dogs $S^{16}$ provided for each column of matter. Also secured to the shaft $S^{13}$ is a toothed segment $S^{12}$, adapted to be engaged by the four teeth of the mutilated gear-wheel $S^{24}$, mounted upon the line-shaft $U^{15}$, at every revolution thereof. This occurs when the lifter-plate S is at the upper portion of its traverse, the dog $S^{16}$ pressing down the last-deposited lead in the holder I and then being raised by the spring $S^{17}$ when the teeth of the gear $S^{24}$ pass out of engagement with the segment $S^{12}$ in order to be out of the way of the said lifter-plate S at the lower limit of its traverse.

The line of type being now placed in the channel T is ready to be operated upon by the line-driver T' and the mechanism for operating the same, the object being to slide the line bodily toward the point of distribution.

$T^2$ is a part of T', (see Figs. 25 and 26,) through which passes a guiding-rod $T^3$, on which $T^2$ moves freely. The motion forward of the line-driver T' is given by a weight $T^5$, Fig. 3, connected to the collar $T^7$, sliding on the rod $T^3$, by a cord or chain $T^8$, passing over a pulley $T^9$. This weight moves inside the tube $T^{10}$ for security. Between the pulley $T^9$ and the weight $T^5$ is interposed a long coiled-wire spring $T^{11}$. (Shown in Fig. 4.) Rigidly connecting $T^7$ and $T^2$ above the rod $T^3$ is the short rod $T^{12}$, Fig. 25, on which is the sleeve $T^{13}$, behind which is the light coiled-wire spring $T^{14}$. As the line of type is advanced and the letters are successively cut off the sleeve $T^{13}$ approaches and finally presses upon the end of the lever U, Figs. 3, 25, and 26. This lever or trip U is fulcrumed two-thirds its length on the top of a stud U', which is firmly fixed to the frame of the machine. The other end of said lever U is pivoted to the lever $U^2$ at $U^3$. The other end of lever $U^2$ is rigidly connected at $U^4$, Fig. 25, to the upper end of the shaft or spindle $U^5$, Fig. 13, rotating in the bracket-bearing $U^6$, rigidly attached to the frame of the machine. At the lower end of the spindle $U^5$ and attached to it by a set-screw is the dog $U^7$, acting against one end of the check-bolt dog $U^8$, Fig. 13, which is rigidly connected to the end of the check-bolt $U^9$, which moves freely in the sleeve $U^{10}$, projecting from the cast frame of the machine. The other end $U^{11}$ of the dog $U^8$ is operated by a cam $U^{12}$, Figs. 10 and 12. The dog $U^7$ is made to act on the dog $U^8$ by the partial rotation of the shaft or spindle $U^5$, the end $U^{11}$ thereof being thrown over the release-cam $U^{12}$, Figs. 10 and 12. This cam serves to lift the check-bolt dog $U^8$ and the check-bolt $U^{13}$, thereby releasing the sliding clutch $U^{14}$, Figs. 10, 11, and 13, which is so feathered to the main shaft $U^{15}$ as to permit it to move longitudinally on said shaft. On being released the clutch $U^{14}$ engages with the clutch $U^{16}$, being forced into clutch by the coiled spring $U^{17}$. The gear $U^{18}$, to which the release-cam $U^{12}$ is rigidly attached, rotates constantly on the main galley-shaft $U^{15}$ by its engagement with the gear $U^{19}$ of shaft G', to the end of which is secured the pulley G. When the clutches $U^{14}$ and $U^{16}$ engage, the shaft $U^{15}$ rotates and operates the line-lifting mechanism and the mechanism for forcing into the lead-holder the rules as they are brought down, as before described. The check-bolt $U^{13}$ being lifted, as described, and the two clutches being engaged, the sliding clutch $U^{14}$ begins to rotate. The rim of the sliding clutch $U^{14}$ is a little larger than the body of the clutch, as seen in Figs. 10 and 12 at $U^{20}$, and cut on its inner side in the form of a shearing-cam. As soon as the check-bolt is lifted above the shoulder $U^{21}$, Fig. 10, the rotation of the sliding clutch $U^{14}$ begins. As the rotation progresses the check-bolt $U^{13}$, as soon as the shoulder has passed, is forced down behind it, so as to act on the shearing-cam $U^{20}$ by the coiled-wire spring $U^{17}$, Fig. 11. As the clutch $U^{14}$ continues to rotate the shearing-cam of clutch $U^{14}$ presses more and more against the check-bolt until the two clutches are forced apart and the rotation of clutch $U^{14}$ is arrested by the shoulder $U^{21}$ striking against the check-bolt $U^{13}$. The main shaft $U^{15}$ has thus made one complete revolution, during which the mechanisms for retracting the line-driver, lifting the line of type, and removing the lead or leads and releasing the line-driver to act upon the line of type to drive it forward for distribution have completed their several movements.

*The line-driver.*—In order to interpose a new line of type from the column between the line-driver T' and the type left standing in the distributing-channel, it is necessary that the line-driver be retracted a distance slightly greater than the width of the type-column during the descent of the line-lifting plate S, Fig. 6, held at rest during the elevation of the new line of type and allowed to move forward, actuated by the weight $T^5$ at the moment the line-lifting plate S has reached its position of rest.

The line-driver T' is retracted against the weight $T^5$ and held at rest by the means of the chain or cord $T^8$, Fig. 25, attached to the drum V, whose movements are now to be described.

Rigidly attached to the main galley-shaft $U^{15}$, nearest the drum V, Figs. 18, 20, 22, and 13, is the mutilated gear $V^2$, one-third the circumference of which is provided with teeth calculated to engage with the pinion $V^3$, rigidly attached to the drum-shaft V', mounted in the bearing $V^{19}$ of the arm $V^{20}$, secured to the frame A. The position of rest of the mutilated gear $V^2$ is such that the first tooth is just outside the line of action of the pinion $V^3$, as shown in Fig. 21. At the end of the drum-shaft opposite the drum and rigidly attached to the shaft is the grooved pulley $V^4$. Attached to the periphery of this pulley is the chain or cord $V^5$, to the other end of which is attached the weight $V^6$. The object of this weight is to keep a constant return tension on the drum-shaft $V'$.

Attached to the frame of the machine A is backward to its first position the instant the main galley-shaft comes to rest.

Contained within the drum V is the adjusting-disk $V^{15}$, rigidly attached to the drum-shaft $V'$ and best shown in Figs. 22 and 24. This adjusting-disk is provided with a suitable number of holes on its face, by means of which the dog $V^{16}$, which is free to rotate on the drum-shaft $V'$, is set in any position relative thereto by means of the screw $V^{17}$, which screws into the dog $V^{16}$ and terminates in a stud $W^{25}$ of the frame A, by means of which the proper tension is applied to the line of type.

The release at the proper instant of the auxiliary driver to operate upon the line of type and its retraction when this operation is to cease is communicated by means of the connecting-rod $W^8$, Figs. 25 and 26, connected to the bell-crank lever $W^9$, Fig. 13, centered to the frame of the machine. The other end of this lever $W^9$ is attached to the rod $W^{10}$, Figs. 14 and 20, which rod terminates in the rack $W^{11}$, which engages with the auxiliary-driver gear $W^{12}$, Fig. 14, free to rotate on the drum-shaft $V'$. This rack is kept in gear with the auxiliary driver-gear by means of the grooved pulley $W^{13}$, Fig. 17, so proportioned as to permit of a slight lateral movement of the rack.

On the upper side of the rack-body is seen the shoulder $W^{14}$, Fig. 17, which is in contact with the pawl $W^{15}$ when the auxiliary line-driver W, Fig. 25, is at the position to commence its operation on the line of type.

The details of the auxiliary line-driver mechanism are shown in Figs. 14, 15, 16, and 17.

Projecting from one side of the auxiliary-driver gear is seen the lug $W^{17}$, capable of engaging with the dog $W^{18}$, which latter is rigidly attached to the drum-shaft. The auxiliary-driver gear otherwise is free to rotate on the drum-shaft and rotates with it only when the lug of the gear and the dog are in contact. It is by means of this dog in contact with the lug of the gear that the auxiliary line-driver is brought back to its starting position by the return rotation of the drum-shaft, as already explained, actuated by the weight $V^6$.

It is evident then that when the drum-shaft commences to rotate under the action of the mutilated gear $V^2$ the dog $W^{18}$ would retreat from the lug of the auxiliary-line-driver gear, and this last would be free to respond to the tension of the auxiliary-line-driver rack $W^{11}$ were it not held in position by the pawl $W^{15}$, whose edge is in contact at this time with the shoulder $W^{14}$ of the rack, as shown in Fig. 14.

To raise the pawl $W^{15}$ at the proper instant and thus allow the auxiliary line-driver to operate on the line of type, the crank $W^{19}$ and pawl-pin $W^{16}$ are provided. This crank $W^{19}$ is attached to the drum-shaft by means of a set-screw $W^{20}$, Fig. 16, and can be so set as to raise the pawl at any desired instant. This adjustment is made necessary on account of the lost motion interposed between the dog $V^{16}$ and the pin $V^{17}$, contained in the main drum V. This lost-motion causes the line-driver to retract at different angular positions of the drum-shaft, according to the width of type-column being distributed, and as it is essential that the line-driver and the auxiliary line-driver shall in no case operate on the line of type at the same time the adjustment of the crank $W^{19}$ is introduced.

After the raising of the pawl $W^{15}$ by the pawl-pin $W^{16}$ the auxiliary line-driver is unaffected by the further rotation of the drum-shaft, the gear being free to respond to the movement of the auxiliary line-driver. It continues to act thus until in the return movement of the drum-shaft the dog $W^{18}$ comes in contact with the lug $W^{17}$ of the auxiliary-line-driver gear, and this last communicates its movement to the auxiliary line-driver by means of the rack, bell-crank, and rods, as described.

The auxiliary line-driver is not retracted until the line-driver is forcing forward the new line of type, and when this last comes in contact with the inclined face of the pawl W, Fig. 25, of the auxiliary line-driver this last is raised and the line of type closed up. When the pawl W arrives at its starting-point, it is still further lifted by the small pin shown at $W^{21}$, Fig. 26, thus holding it entirely clear of the line of type and permitting this last to move entirely free under the action of the line-driver. The lines of type have now been placed in the channel T and fed along it to a point X, where one by one they are taken off and duly distributed by the distributing mechanism.

The distributing mechanism is actuated by shaft $G'$ and beveled gear-wheel $G^2$, firmly connected to shaft $G'$, Fig. 28. $G^2$ acts upon the beveled gear-wheel $G^3$ of shaft $G^4$, the other end of which actuates the revolving disk B, which may be of any suitable size. I use one of a diameter of twenty and three-fourths inches, but I do not limit myself to this dimension. The disk B has its bearing on its lower surface upon the frame of the machine, as seen at $B'$ and $B^2$, Fig. 28. Upon its upper side are two rings $B^3$ and $B^4$, one above the other, $B^3$ being provided with projections or vertical pins $B^5$ and ring $B^4$ with radial lugs $B^6$. These rings move freely about the upper end of shaft $G^4$, resting on annular flanges of the disk B, as seen in section in Fig. 28 at $B^7$ and $B^8$. There are a number of adjustable pieces $B^{11}$, Figs. 35 and 36, secured to the disk B by screws $B^{10}$, and to the outer end of which at $B^{12}$ is pivoted an arm $B^{14}$ to move freely about the point $B^{12}$. I have found it convenient to use forty of those adjustable pieces $B^{11}$, though I do not limit myself to this number. In Fig. 27 are seen a number of arms $B^{14}$, as described, arranged about the center $G^4$, connected to the pieces $B^{11}$ at $B^{12}$. This arm $B^{14}$ at its other end receives the type one by one and delivers them into channels whose wards correspond with the nicks on each type. When the type reach the end X of the channel T, they are arrested at the end by the pawl $X'$, Figs. 25, 27, and 32. In Figs. 27, 28, and 32 two flat rings $X^2$, whose outer circumferences are cut into a series of cams, are attached firmly to the disk B by the screws $X^3$, and while separated from one another are placed in similar juxtaposition, forming a measuring-cam ring.

The pawl $X'$ is actuated by a lever $X^4$, fulcrumed on the pin $X^5$, set into the frame of the machine A, in one end of which is the sliding block $X^6$, to which block the pawl $X'$ is freely connected by the pin $X^7$. The other end $X^8$ of the lever $X^4$, Figs. 27 and 32, carries a roller $X^9$, moving on the pivot $X^{10}$. This roller moves on the face of the cam-ring $X^{11}$, Figs. 27 and 41, supported by the piece $X^{12}$, which is rigidly connected to it at $X^{13}$ and held in position by the screw $X^{14}$, which is connected to the disk B of the machine. This ring $X^{11}$ has on its face a series of cams. As the disk rotates, the roller $X^9$ moves over them, alternately retracting the pawl $X'$ against the pressure of the coiled spring $X^{15}$. The cams on the face of this ring are timed to withdraw the pawl $X'$, which arrests the movement of the type in channel T, Fig. 32, and so permit the type to move freely forward against the measuring-cams $X^2$, already described.

The arm $B^{14}$, before referred to, of which there may be twenty or more on the disk, (I find forty a good number,) is shown in detail in Figs. 35, 36, 37, 38, and 39. In Fig. 35 is a section of the working parts of the arm $B^{14}$. The outer end of $B^{14}$ is slotted to receive the piece $Y'$, as seen in Fig. 35. This piece is held in place by the screw $Y^2$ passing through the rear of $B^{14}$ at Y, and the other end of said screw entering $Y'$ at $Y^4$, Fig. 35. About the body of the screw $Y^2$ is the coiled spring $Y^5$, the office of which is to force forward the piece $Y'$ to expel the type at the right moment into its proper channel. At $Y^6$, Figs. 36 and 41, is seen a cam-formed shoulder, being a part of the piece $B^{14}$. The two parts $Y^7$ of $Y'$, Figs. 38, 39, and 43, are partly cut away at the ends, (shown at $Y^8$.) When the type-line has pressed the end type against the face of the cam $X^2$, Figs. 32 and 41, it cannot advance until the moving disk presents to the type the retreating face of the cams $X^2$. This advance of the type causes the inner corner of the two cam-shaped pieces $Y^6$, Figs. 35, 36, and 41, to press on the side of the type while it advances into the slot in the face of $B^{14}$, (seen at $Y^9$, Figs. 32 and 41.) The arm $B^{14}$, being free to move about the pivot $B^{12}$, waits the entrance of the type, which, being pressed, enters until it has passed beyond the wall of the channel end X, Figs. 32 and 41, as described. The arm $B^{14}$ is given an elastic pressure on the side by the spring $B^{50}$, Figs. 27 and 32, by means of which the type is cut off and carried along in the direction of the moving arms. The face of the cam $Y^6$, Figs. 32 and 36, passes in front of the line of type as the end letter is carried away and forces the rest of the line back until the pawl $X'$ again moves in front of the line and arrests it. The piece $Y'$ has been pushed back by the action of the cam-ring $Y^{10}$, secured to the frame A, Fig. 32, operating against the shoulder $Y^0$, Fig. 39, of the piece $Y'$, compressing the coil-spring $Y^5$, Fig. 35. As the disk revolves and the arms successively approach the end of the line where the letters are delivered into the slot in the arm, the piece $Y'$ is gradually pressed back, so that when the arm arrives at the point to receive the type the opening in the end of the arm is sufficient to receive a three-em quad. The arm having received the type, as described, moves forward, the cam $Y^{10}$, that holds back the piece $Y'$, rapidly recedes, allowing the piece $Y'$ to advance until the ends $Y^8$, Fig. 39, rest firmly against the type, pressing it against the inner face of the part of the frame A which supports the disk. The outer ends of the arms $B^{14}$ pass very close to this inner surface. When the cam $Y^{10}$ ceases to operate against the shoulder $Y^0$, the spring $Y^5$, Fig. 35, forces forward the piece $Y'$, which presses on the type at three points $Y^8$, $Y^{13}$, and $Y^8$. When the type arrives at its appropriate channel, it is shot into it by the action of the spring $Y^5$. As the arm $B^{14}$ sweeps by, the type so delivered into a channel is struck by the two cams $Y^6$ near the top and bottom, as seen in section, Fig. 35, and forced back, so as to allow the entrance of the next type into the same channel.

*Receiving-channels.*—The removable channels E, into which the type are pushed, as described, are supported at their lower end by a series of plates $Z^0$, firmly attached to the frame of the machine A. The lower face of these plates is provided with wards Z. In order that the type may enter the channels E, they must have nicks $Z^3$ to correspond with the ward of its designated channel. The wards and nicks vary in position in each channel, so that only type of one kind can enter any channel. Besides the wards Z at the ends of these plates, each one of them is provided with a small spring (seen at $Z^2$, Figs. 35 and 36) set in the side of the plate $Z^0$, whose office is to support the column of type in the channel and prevent its falling back against the type-carrier arms $B^{14}$ as they pass by. The cams $Y^6$, after the ejector has forced the type into the mouth of the channel, act against it, forcing it and the line of type above it back, so that the spring $Z^2$ acts to press against its side and hold it firmly in position until the next type enters and takes its place against the spring. The channels E, in which the type stand as distributed, are formed by the steel plates $Z^0$, firmly attached to the frame of the machine by the screw and pin $Z^4$. These plates terminate at $Z^5$, the channel being enlarged at the upper end to admit the removable type-holders E', Figs. 27 and 1. The upper end of these plates admits the said removable type-holders E', so that the type being pushed back, as described, through the channels formed by the plates $Z^0$ enter the removable type-holders E'. When these type-holders E' are nearly full, they can be taken off and empty ones substituted. These type-holders are supported at their lower ends by their bearing on the two fixed plates, as described, and at their other ends are supported by the segment F, Fig. 1. This segment F has pins around its whole face, between which the upper ends of the removable type-holders rest. The segment F is held in place by the three supports F', firmly connected to the frame of the machine A. When so filled, they are placed on a rack for future use in a type-setting machine or placed at once on that machine. These channels are rolled from brass or steel of a thickness to retain their shape in use and preferably about two feet long. As the type are lifted into the channel T from the galley, they may be either dry or wet or firmly cemented together, as in stereotyping. In order that the arm that receives a single type may be able to cut it off when it has completely entered, more pressure may be required than that exerted by the spring $B^{50}$. This pressure is needed only at the point where the operation of cutting off is proceeding. In other words, the spring $B^{50}$ must be reinforced for an instant. To do this is the office of the circular piece $B^4$, Figs. 27 and 32. This piece has on its periphery as many radial lugs $B^6$ as there are arms $B^{14}$, as seen in Fig. 27. In Fig. 32 at $Y^{17}$ is seen the shoulder $Y^0$ of the piece $Y'$ beginning to be acted on by the cam $Y^{10}$. As the disk revolves, the shoulder $Y^0$ is still further forced back, as seen at $Y^{18}$, same figure. At this point the piece $Y'$ is so far retracted that the pin or screw $Y^2$, Fig. 35, is made to project from the inner end of arm $B^{14}$ (seen at $Y^{21}$, Fig. 32) and engages with a lug $B^6$ of the piece $B^4$. This piece, as before described, moves freely about the center $G^4$, Fig. 27. It could offer no aid to the spring $B^{50}$ were it not connected to the disk B by the coiled spring $B^{20}$ at $B^{19}$ and to the piece $B^4$ at $B^{21}$. Any tension whatever may thus be applied to the arm $B^{14}$ at the point where the arm is required to cut off the end type. Each arm as it passes the channel end X is thus reinforced at the instant only of taking the type. As it passes on with the type, the shoulder $Y^0$ rapidly descends along the cam $Y^{10}$, and the pin $Y^2$ is disengaged from the tooth $B^6$ until at $Y^{20}$ the piece $Y'$ has been made to close upon the type and hold it firmly.

*Safety-plate.*—In Fig. 32 is a view of the circular piece $B^3$, also moving freely about the center $G^4$. This piece is provided with as many short pins $B^5$ as there are arms on the disk. This piece $B^3$ is so adjusted that the pins $B^5$ engage with the arms $B^{14}$, if for any reason the arms are swung back, by being arrested while the disk continues to revolve. It is evident that if the disk were suddenly retarded by the stoppage of one of the arms, the strain would injure the arm or the machine. In order to avoid this, it is necessary to arrest the movement of the disk instantly upon any arm being held back by any obstruction to its free movement beyond a certain limit. This limit is fixed by the position of the pins $B^5$ on the piece $B^3$. The adjustment of one pin in relation to one arm adjusts all. As before said, these pins $B^5$, set in the circular piece $B^3$, engage with the arms $B^{14}$ if the arms are arrested from whatever cause, as seen at $B^{22}$, Fig. 32. At $B^{40}$, same figure, is seen a small plate held in position by the screws $B^{41}$ and allowed to move in the slots $B^{42}$, Fig. 33. When the disk is revolving, the plate is in the position seen in Figs. 32 and 33 and held there by the coiled spring $B^{43}$, connected at $B^{44}$ to the disk B. $B^{45}$ is an arm connected adjustably to the small plate $B^{40}$ at $B^{46}$, and the other end passing beneath the arm $B^{14}$, and also below one arm $B^{52}$ of $B^3$, forms a hook $B^{47}$ back of said arm, by means of which it may engage with said arm of $B^3$, actuated through any arm $B^{14}$. Figs. 33 and 34 are sectional views of this part of the disk mechanism. $B^{53}$ is a safety-bolt moving freely in the disk. In Fig. 33 it is seen to have on its lower end a number of teeth $B^{54}$. Situated directly below this is a rack $B^{61}$, firmly secured to the frame of the machine A below the disk. In Fig. 34 the teeth on this bolt $B^{53}$ are seen to be engaged with the teeth of the rack $B^{61}$. In this last position the disk is locked and cannot revolve. In Fig. 33 it is shown to be free from the rack $B^{61}$, in which position the disk is free to revolve. At $B^{71}$ is seen a coiled spring acting on a shoulder of the bolt $B^{53}$, which tends to drive the bolt into clutch with the rack $B^{61}$. In Fig. 33 this coiled spring is compressed and the bolt is held out of clutch by a part of the small movable plate $B^{40}$ having entered a slot $B^{81}$ on the side of the bolt $B^{53}$. When the bolt is drawn out by the handle $B^{91}$, it compresses the spring $B^{71}$, and the movable plate $B^{40}$ engages with the slot $B^{81}$ in the side of the bolt, the plate being actuated by the coiled spring $B^{43}$. This holds the bolt firmly out of clutch while the disk revolves. If any arm is arrested, as before described, it acts against some one of the pins $B^5$, which causes the circular piece $B^3$ to move back. This movement causes the plate $B^3$ to press back the hook $B^{47}$, thereby disengaging the plate $B^{40}$ from the slot $B^{81}$ and permitting the bolt $B^{53}$ to instantly engage with rack $B^{61}$, as described. By means of this device neither type nor any part of the machine is injured by the sudden arresting the movements of the arms.

Having thus fully described my invention, what I claim is—

1. In a type-distributing machine, the combination with the type-galley, the blocks located thereon, and the column-lifter, of the rods secured to said block and passing through the column-lifter and the coiled springs interposed between said lifter and blocks, substantially as described.

2. In a type-distributing machine, the combination with the type-galley and column-lifter, of the movable lifting-plate having a step or shelf, the pitmen $S^9$ and $S^{11}$ pivoted thereto and to the gears $S^{21}$ and $V^2$ of the shaft $U^{15}$, for the purpose and substantially as described.

3. In a type-distributing machine, the combination with the type-galley and the lead-holder located beneath the same, of the movable lifting-plate having a shelf or step and provided with a spring-actuated plate, substantially as and for the purpose specified.

4. In a type-distributing machine, the combination with the type-galley and the lead-holder located below the same, of the movable lifting-plate having a step or shelf and provided with a spring-actuated plate, the pitmen pivoted to said plate, the gears with which said pitmen are connected and the rotatable shaft to which said gears are secured, substantially as described.

5. In a type-distributing machine, the combination with the automatic type-galley on which the dead matter is placed for distribution, the column-lifter provided with the blocks $P^2$ and the springs $P^4$, the mechanism as described for forcing out the leads and a rotatable disk provided with type-carriers secured thereto, substantially as described.

6. In a type-distributing machine, in combination with the type-galley, the vertically-moving lifting-plate S to elevate the end line of type from the galley, the horizontally-moving line-forcer for moving the type so elevated to the point whence they are taken to be distributed and the drum V for adjusting said line-forcer to the length of line to be moved forward, substantially as described.

7. In a type-distributing machine, the combination of a type-galley, a lead-holder Q, mechanism for elevating the lines of type from the said type-galley, and for placing the leads in the said lead-holder, and a mechanism for forcing the said leads into the lead-holder comprising the presser-dog $S^{16}$, intermittently-actuating gears therefor and the retracting-spring, substantially as and for the purpose described.

8. In a type-distributing machine, the combination with the type-galley and the vertically-movable lifting-plate, of the horizontally-movable line-driver, the chain or rope connected therewith, the pulley over which said chain or rope passes, the coiled spring connected with said chain or rope, the weight secured to said spring, and the tube in which said weight is located, substantially as described.

9. In a type-distributing machine, the combination with the main galley-shaft $U^{15}$, the spur-gear $U^{18}$ secured thereto, the release-cam $U^{12}$ and clutch $U^{16}$ connected therewith, the sliding spring-actuated clutch $U^{14}$, the cam $U^{20}$ having shoulder $U^{21}$, the spring-actuated check-bolt $U^{13}$, the check-bolt lever secured thereto, the shaft $U^5$ and dog $U^7$ secured thereto, of the horizontally-movable line-driver T', and connections, whereby shaft $U^5$ is actuated by the movement of said line-driver, substantially as described.

10. In a type-distributing machine, the combination with the main galley-shaft, the spur-gear $U^{18}$ secured thereto, the release-cam $U^{12}$ and clutch $U^{16}$ connected therewith, the sliding spring-actuated clutch $U^{14}$, the cam $U^{20}$ having shoulder $U^{21}$, the spring-actuated check-bolt $U^{13}$, the check-bolt dog $U^8$ secured thereto, the shaft $U^5$ and dog $U^7$ secured thereto, of the horizontally-movable line-driver T', the rod $T^{12}$, the sleeve $T^{13}$ mounted thereon, the lever U fulcrumed intermediate its ends to the frame of the machine and the lever pivoted thereto and secured to said shaft $U^5$, substantially as described.

11. In a type-distributing machine, the combination with the movable line-lifting plate, having spring-actuated lead-lowering plates, the main galley-shaft, the type and the lead holder located below the same, of the forcer-gear $S^{21}$ secured to said galley-shaft, the lead-forcer segment $S^{12}$ with which said gear engages the shaft $S^{13}$ to which said segment is secured, the lead-forcer $S^{16}$ also secured to said shaft, and the helical spring $S^{17}$, substantially as described.

12. In a type-distributing machine, the combination with the line-driver, the chain or rope secured thereto and the weight for moving said line-driver forward, of the retracting chain or rope also secured to said line-driver, the drum V secured to shaft V' upon which said chain or rope is wound, substantially as described.

13. In a type-distributing machine, the combination with the line-driver, the chain or rope secured thereto and the weight for moving said line-driver forward, of the retracting chain or rope also secured to said line-driver, shaft V', the drum V secured thereto upon which the retracting chain or rope is wound, the pulley $V^4$ secured to said shaft, having chain $V^5$ and weight $V^6$ and pin or stud $V^{11}$, the pinion also secured to said shaft, the main galley-shaft $U^{15}$, the mutilated gear $V^2$ secured thereto, meshing with said pinion and the spring-pawl $V^6$ with which said pin engages, substantially as described.

14. In a type-distributing machine, the combination with the line-driver, the chain or rope secured thereto and the weight for moving said line-driver forward, of the retracting chain or rope also secured to said line-driver, the shaft V', the drum secured thereto upon which the retracting chain or rope is wound, the pulley $V^4$ secured to shaft V' having pawl-pin $V^{11}$, chain $V^5$ and weight $V^6$, the pinion also secured to said shaft, the main galley-shaft $U^{15}$, the mutilated gear $V^2$ having release-pin $V^{12}$ and the pawl $V^8$, substantially as described.

15. In a type-distributing machine, the combination with the line-driver, the chain or rope secured thereto and the weight for moving said line-driver forward, of the retracting chain or rope also secured to said line-driver, the shaft V', the drum V, the grooved pulley having pawl-pin $V^{11}$, the stop-pin $V^{13}$, the chain $V^5$ and weight $V^6$, the pinion also secured to said shaft, the main galley-shaft $U^{15}$, the mutilated gear $V^2$ having release-pin $V^{12}$, the pawl-standard $V^7$, the spring-pawl pivoted thereto and the stop-pin $V^{14}$ secured to said pawl-standard, substantially as described.

16. In a type-distributing machine, the combination with the shaft $V'$, the drum secured thereto and connected with a line-driver, the adjusting-disk $V^{15}$ located within said drum, provided with a series of holes, the dog $V^{16}$ rotatable on shaft $V'$, the screw $V^{17}$ connected with said dog and the pin $V^{18}$ secured to said drum, substantially as described.

17. In a type-distributing machine, the combination with the shaft $V'$, the drum $V$ secured thereto, the adjusting-disk $V^{15}$ located within said drum, provided with a series of holes, the dog $V^{16}$ rotatable on shaft $V'$, the screw $V^{17}$ connected with said dog and the pin $V^{18}$ secured to said drum, of the grooved pulley $V^4$ having pawl-pin $V^{11}$, the stop-pin $V^{13}$, the chain $V^5$ and weight $V^6$, the pinion $V^3$, the main galley-shaft $U^{15}$, the mutilated gear $V^2$ having release-pin $V^{12}$, the pawl-standard $V^7$, the spring-pawl $V^8$ and the stop-pin $V^{14}$ secured to said standard, substantially as described.

18. In a type-distributing machine, the combination with the frame of the machine, of the auxiliary line-driver comprising pawl $W$, the lever $W^2$, the chain or cord $W^4$, the pulleys $W^5$ and $W^6$ over which said chain or cord passes and the spring $W^7$ connected with said chain or cord, substantially as described.

19. In a type-distributing machine, the combination with the pawl $W$, the lever $W'$ and the cord or chain connected therewith, of the rod $W^8$ connected with said lever, the bell-crank lever $W^9$ attached thereto, the rod $W^{10}$, rack $W^{11}$, the gear $W^{12}$ on shaft $V'$, the pawl $W^{15}$ engaging with a shoulder $W^{14}$ on said rack, the dog $W^{18}$ on said shaft, the lug $W^{17}$ with which said dog engages, the crank $W^{19}$ secured to shaft $V'$, the pawl-pin $W^{16}$ and pin $W^{21}$, substantially as described.

20. In a type-distributing machine the combination with the pawl $W$, lever $W^2$, rod $W^8$, bell-crank lever $W^9$ and rod $W^{10}$, of the rack $W^{11}$, and means substantially as described for actuating the same.

21. In a type-distributing machine, the combination with the auxiliary line-driver and the rack connected therewith, having a shoulder, of the dog $W^{15}$ adapted to engage with said shoulder, the gear $W^{12}$ engaging with said rack, the shaft $V'$ upon which said gear is mounted, the lug $W^{17}$ on said shaft, the dog $W^{18}$, the crank $W^{19}$ and the pin $W^{16}$, substantially as described.

22. In a type-distributing machine, the combination with a rotatable disk with type-carriers secured thereto, of a safety-plate $B^3$ actuated by any one of said carriers to arrest the movement of said disk, substantially as described.

23. In a type-distributing machine, an automatic type-galley in combination with a rotatable disk to which type-carriers are movably secured, the safety-plate $B^3$ actuated by any one of said type-carriers to arrest the movement of said disk, substantially as described.

24. In a type-distributing machine an automatic type-galley in combination with a rotatable disk with one or more type-carriers thereto movably secured, the plate $B^4$ with teeth $B^6$ and spring $B^{20}$ actuated by each of said carriers to reinforce the cut-off action thereof at the point where the type is cut off for distribution, substantially as described.

25. In a type-distributing machine, a rotatable disk with type-carriers thereto movably secured in combination with a safety-plate $B^3$ provided with as many pins $B^5$ as there are type-carriers adapted to engage each of said carriers, the plate $B^{40}$ and the piece $B^{45}$ actuated by said plate $B^3$ and bolt $B^{53}$ with a recess engaged by plate $B^{40}$, the ratchet-teeth at its end and a handle portion, substantially as described.

26. In a type-distributing machine in combination with a rotatable disk provided with type-carriers movably secured, the reinforcing-plate $B^4$ provided with the teeth $B^6$ adapted to be engaged by said type-carriers and actuated by coiled spring $B^{43}$ to increase the cut-off action of said carriers at the instant when each carrier takes off a single type, substantially as described.

27. In a type-distributing machine, the combination of a galley, means for taking the lines therefrom and placing them in a channel, a rotating disk with means for actuating the same, type-carrier arms pivoted to said disk and adapted to strike the type from the said line-channel, combined with a series of radially-disposed channels adapted to receive nicked type from the said arms, a spring in said arm adapted to press the said type into said channel, and the cam $Y^6$ of said arm to press the said type in the manner and substantially as described.

28. In a type-distributing machine, a distributer-disk therefor, distributer-arms comprising the arm $B^{14}$ pivoted to the said disk, the type-seat $Y'$ slidably mounted within the arm, a spring actuating the said seat, the cam-lug $Y^0$ of said type-seat, the cams $Y^6$ at the end of the arm $B^{14}$, combined with means for actuating the said disk, substantially as and for the purpose described.

29. In a type-distributing machine, the combination with the rotatable disk provided with movable type-carriers, of the channel $X$, the pawl $X'$, the spring $X^{15}$ and the ring $X^{11}$ for actuating said pawl, substantially as described.

30. In a type-distributing machine, the combination with the rotatable disk, provided with movable type-carriers, of the measuring-cams, the pawl $X'$ and the cams to operate said pawl, substantially as and for the purpose described.

31. In a type-distributing machine, the combination with the type-galley, of the rotatable disk provided with radial type-carrying arms, and the radial channels provided with wards and adapted to receive nicked type from the said arms, substantially as described.

32. In a type-distributing machine, the combination of a feeding-galley, a rotatable disk provided with type-carriers thereto movably connected, mechanism for reinforcing the cut-off action of said type-carriers at the instant of the action of said carriers to cut off a single type, and mechanism to automatically arrest the movement of said disk and the radial channels into which said carriers deliver the type as described and for the purpose set forth.

33. In a type-distributing machine, the combination of a rotatable disk provided with radial type-carrying arms thereto movably secured, the adjustable piece $B^{11}$, the arm or carrier $B^{14}$ secured thereto, and the piece $Y'$, the screw $Y^2$, and the coiled spring $Y^5$ therefor, as and for the purpose described.

34. In a type-distributing machine, the combination of a rotatable disk, type-carriers $B^{14}$ thereto movably secured, the ejecting mechanism $Y'$, $Y^2$ and $Y^5$ thereof, the spring $B^{50}$ actuating said type-carriers $B^{14}$ to cut off the end type of the line to be distributed, and the toothed plate $B^4$ actuated by the spring $B^{20}$ to reinforce said spring $B^{50}$, substantially as described.

35. In a type-distributing machine, the combination with the removable channels $E'$, of the channel-plates $Z^0$, the supporting-piece F, the rotatable disk B, the type-carrier arm $B^{14}$ mounted thereon, and mechanism to supply said arms with type and to actuate the same, substantially as described.

36. In a type-distributing machine, in combination a rotatable disk provided with type-carrier arms thereto movably secured, the cam $Y^{10}$ for retracting the ejecting-piece $Y'$ by its shoulder $Y^0$ at the point where the type are cut off the end of the line to be distributed by said carriers, the pin or screw $Y^2$ connected to said piece $Y'$, the ring or plate $B^4$ provided with the spring $B^{20}$ and as many teeth on its edge as there are type-carrier arms with which said pin or screw $Y^2$ engages to reinforce the cut-off action of said carrier-arms, the spring $Y^5$ actuating the piece $Y'$ to eject the type from the carrier at the proper point as and for the purpose described.

37. In a type-distributing machine the combination with a rotatable disk with type-carrier arms thereto movably secured, of a plate $B^3$ provided with as many pins $B^5$ as there are type-carrier arms, the plate $B^{40}$ movably connected to said disk the spring $B^{43}$ actuating said plate $B^{40}$ and the piece $B^{47}$ adjustably connected to plate $B^{40}$ and bent at one end to engage with the arm of plate $B^3$ when said plate $B^3$ has been moved back by a carrier acting on the pin $B^5$, as and for the purpose described.

38. In a type-distributing machine, the rotatable disk provided with type-carrier arms thereto movably secured in combination with the safety-plate $B^3$ provided with the pins $B^5$, the plate $B^{40}$ movably connected to said disk and provided with the adjustable piece $B^{47}$ bent to engage with an arm of said plate $B^3$ the coiled spring $B^{43}$ actuating said plate $B^{40}$ and the bolt $B^{58}$, the end of which is toothed, provided with a slot $B^{81}$, the spring $B^{71}$ actuating said bolt to engage with the ratchet $B^{61}$ when not in engagement with said plate $B^{40}$, as and for the purpose described.

39. In a type-distributing machine, the combination with the rotatable disk B and the arms $B^{14}$ of the pawl $X'$, spring $X^{15}$ and channels E, substantially as described.

40. In a type-distributing machine, the combination of the rotatable disk with type-carrier arms thereto movably secured, the cam-ring $X^{11}$ firmly connected to said disk, the pawl $X'$ actuated by the said cam-ring through the roller $X^9$ of the pivoted lever $X^8$, the spring $X^{15}$ and the channel carrying type to the carriers $B^{14}$, substantially as and for the purpose described.

41. In a type-distributing machine, the combination of a galley automatically feeding the matter to be distributed, to the distributing mechanism, a lead-holder situated below said galley, into which the leads are automatically delivered, a rotatable disk provided with type-carrier arms thereto movably secured, said carriers constructed to each receive a single nicked character or type from said galley, in succession and to deliver the same into their appropriate receptacles, a safety mechanism by means of which the mount of said disk may be arrested, a reinforcing mechanism to increase the cut-off force of the said carriers at the point where each letter is received from the galley and a series of receptacles for type provided with wards and a friction-spring as and for the purpose described.

In testimony whereof I affix my signature in presence of two witnesses.

ALEXANDER DOW.

Witnesses:
LORENZO DOW,
GEO. S. PERKINS.